United States Patent
Abbaszadeh et al.

(10) Patent No.: US 11,916,940 B2
(45) Date of Patent: Feb. 27, 2024

(54) ATTACK DETECTION AND LOCALIZATION WITH ADAPTIVE THRESHOLDING

(71) Applicant: General Electric Company, Schenectady, NY (US)

(72) Inventors: Masoud Abbaszadeh, Clifton Park, NY (US); Matthew Christian Nielsen, Scotia, NY (US); Weizhong Yan, Clifton Park, NY (US); Justin Varkey John, Cohoes, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 186 days.

(21) Appl. No.: 17/228,191

(22) Filed: Apr. 12, 2021

(65) Prior Publication Data
US 2022/0329613 A1   Oct. 13, 2022

(51) Int. Cl.
*H04L 29/06* (2006.01)
*H04L 9/40* (2022.01)

(52) U.S. Cl.
CPC ...... *H04L 63/1425* (2013.01); *H04L 63/1416* (2013.01)

(58) Field of Classification Search
CPC . H04L 63/1425; H04L 63/1416; H04L 63/14; Y04S 40/20; Y04S 10/20
See application file for complete search history.

(56) References Cited

U.S. PATENT DOCUMENTS

| | | | | |
|---|---|---|---|---|
| 8,924,333 | B2 * | 12/2014 | Biem | G06F 21/552 |
| | | | | 706/46 |
| 9,426,169 | B2 * | 8/2016 | Zandani | G06F 21/57 |
| 9,930,058 | B2 * | 3/2018 | Carpenter | H04L 43/04 |
| 10,417,415 | B2 * | 9/2019 | Abbaszadeh | G06N 20/00 |
| 10,785,255 | B1 * | 9/2020 | Otvagin | H04L 63/145 |

(Continued)

FOREIGN PATENT DOCUMENTS

| | | | | |
|---|---|---|---|---|
| CN | 105357228 A | * | 2/2016 | ......... H04L 63/1416 |
| CN | 110474878 A | * | 11/2019 | ........... G06N 3/0445 |

OTHER PUBLICATIONS

Kabore, Review of Anomaly Detection Systems in Industrial Control Systems Using Deep Feature Learning Approach, Jan. 13, 2021, Scientific Research Publishing, Engineering 2021 13, 30-44 (Year: 2020).*

(Continued)

*Primary Examiner* — Darshan I Dhruv
(74) *Attorney, Agent, or Firm* — Buckley, Maschoff & Talwalkar LLC

(57) ABSTRACT

According to some embodiments, a system, method, and non-transitory computer readable medium are provided comprising a plurality of real-time monitoring nodes to receive streams of monitoring node signal values over time that represent a current operation of the cyber physical system; and a threat detection computer platform, coupled to the plurality of real-time monitoring nodes, to: receive the monitoring node signal values; compute an anomaly score; compare the anomaly score with an adaptive threshold; and detect that one of a particular monitoring node and a system is outside a decision boundary based on the comparison, and classify that particular monitoring node or system as anomalous. Numerous other aspects are provided.

20 Claims, 20 Drawing Sheets

(56) References Cited

U.S. PATENT DOCUMENTS

| | | | |
|---|---|---|---|
| 10,819,725 B2 | 10/2020 | Abbaszadeh et al. | |
| 2006/0171175 A1* | 8/2006 | Zhu | H02M 3/33507 |
| | | | 363/21.12 |
| 2015/0192315 A1* | 7/2015 | Marik | F24F 11/64 |
| | | | 700/275 |
| 2017/0063905 A1* | 3/2017 | Muddu | G06N 7/01 |
| 2017/0279831 A1* | 9/2017 | Di Pietro | H04L 43/0894 |
| 2019/0081876 A1* | 3/2019 | Ghare | H04L 63/1425 |
| 2019/0121978 A1* | 4/2019 | Kraemer | G06F 21/565 |
| 2020/0036743 A1* | 1/2020 | Almukaynizi | G06N 5/048 |
| 2020/0067969 A1* | 2/2020 | Abbaszadeh | G06N 20/10 |
| 2020/0327953 A1 | 10/2020 | Fleming et al. | |

OTHER PUBLICATIONS

Khan, Cybersafety Analysis of Industrial Control System for Gas Turbines, Oct. 2018, Cybersecurity Interdisciplinary Systems Laboratory, Working Paper CISL# Dec. 2018, 1-37 (Year: 2018).*

Dani, Adaptive Threshold for Anomaly Detection Using Time Series Segmentation, Nov. 2015, International Conference on Neural Information Processing, 1-8 (Year: 2015).*

European Search Report and Written Opinion dated Aug. 17, 2022 which was issued in connection with EP22167738.8.

Dani Mohamed-Cherif et al: "Adaptive Threshold for Anomaly Detection Using Time Series Segmentation", Dec. 9, 2015 (Dec. 9, 2015), SAT 2015 18th International Conference, Austin, TX, USA, Sep. 24-27, 2015; [Lecture Notes in Computer Science; Lect.Notes Computer], Springer, Berlin, Heidelberg, pp. 82-89, XP047335371, ISBN: 978-3-540-74549-5 [retrieved on Dec. 9, 2015].

Khan, Shaharyar et al., "Cybersafety Analysis of Industrial Control System for Gas Turbines", Working Paper CISL# Dec. 2018, Oct. 2018, 38pgs.

Kabore, Raogo et al., "Review of Anomaly Detection Systems in Industrial Control Systems Using Deep Feature Learning Approach", Engineering, 13, 2021, (pp. 30-44, 15 total pages), https://doi.org/10.4236/eng.2021.131003.

* cited by examiner

| Trigger element | Threshold level |
|---|---|
| DWATT < 50 | THR = 0.35 |
| ETIM < 15 | THR = 0.55 |
| DLN mode on & DWATT> 25 | THR = 0.65 |
| IBH%>80 | THR= 0.6 |
| Otherwise | THR= 0.5 |

FIG. 18

ATTACK DETECTION AND LOCALIZATION WITH ADAPTIVE THRESHOLDING

This invention was made with Government support under contract number DE-OE0000833 awarded by the Department of Energy. The Government has certain right in this invention.

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.) that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain." Such attacks can diminish the performance of a control system and may cause total shut down or even catastrophic damage to a plant. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). It may also be important to determine when a monitoring node is experiencing a fault (as opposed to a malicious attack) and, in some cases, exactly what type of fault is occurring. Existing approaches to protect a cyber physical system may use classification decision boundaries that are trained offline. These decision boundaries may be subject to false positives and false negatives in the real-time operation environment. It would therefore be desirable to protect a cyber-physical system from cyber-attacks in an automatic and accurate manner taking into account differences between an offline and real-time environment.

SUMMARY

According to some embodiments, a system is provided including a plurality of real-time monitoring nodes to receive streams of monitoring node signal values over time that represent a current operation of the cyber physical system; and a threat detection computer platform, coupled to the plurality of real-time monitoring nodes, to: receive the monitoring node signal values; compute an anomaly score; compare the anomaly score with an adaptive threshold; and detect that one of a particular monitoring node and a system is outside a decision boundary based on the comparison, and classify that particular monitoring node or system as anomalous.

According to some embodiments, a method is provided including receiving a stream of monitoring node signal values from a plurality of real-time monitoring nodes, wherein the monitoring node signal value represent a current operation of the cyber physical system; computing an anomaly score; comparing the anomaly score with an adaptive threshold; and detecting that one of a particular monitoring node and a system is outside a decision boundary based on the comparison, and classifying that particular monitoring node or system as anomalous.

According to some embodiments, a non-transitory computer readable medium storing program code is provided, the program code executable by a computer processor to cause the processor to perform a method to protect a cyber physical system associated with a plurality of monitoring nodes, each generating a series of current monitoring node values over time that represent a current operation of the cyber physical system, the method including: receiving a stream of monitoring node signal values from the plurality of real-time monitoring nodes; computing an anomaly score; comparing the anomaly score with an adaptive threshold; and detecting that one of a particular monitoring node and a system is outside a decision boundary based on the comparison, and classifying that particular monitoring node or system as anomalous.

Some technical advantages of some embodiments disclosed herein are improved systems and methods to protect one or more cyber-physical systems from abnormalities, such as cyber-attacks, in an automatic and accurate manner.

BRIEF DESCRIPTION OF THE DRAWINGS

FIG. 18 is portion of a tabular cyber-physical system database in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1A:
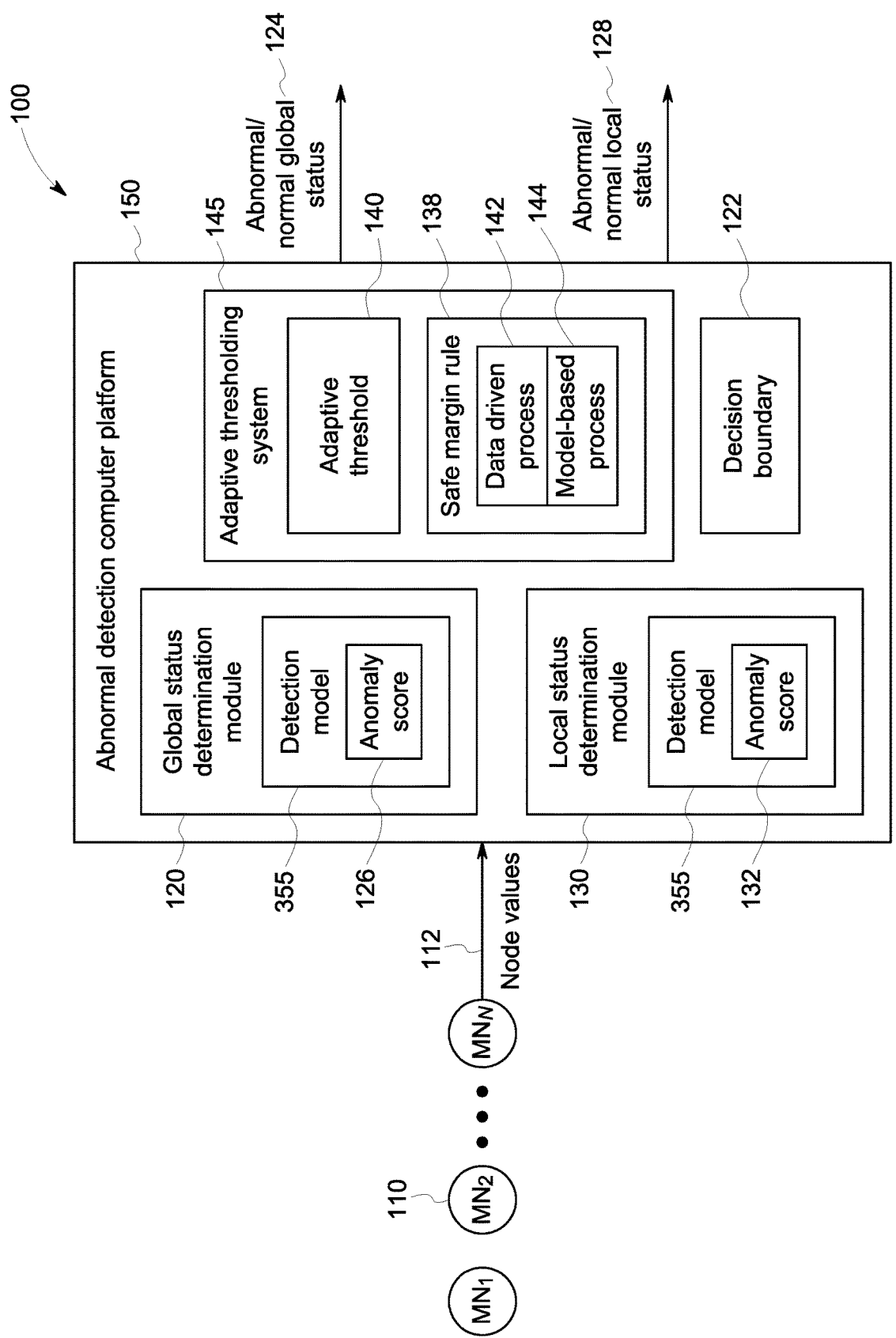
FIG. 1A is a high-level block diagram of a system that may be provided in accordance with some embodiments.
Figure 3A:
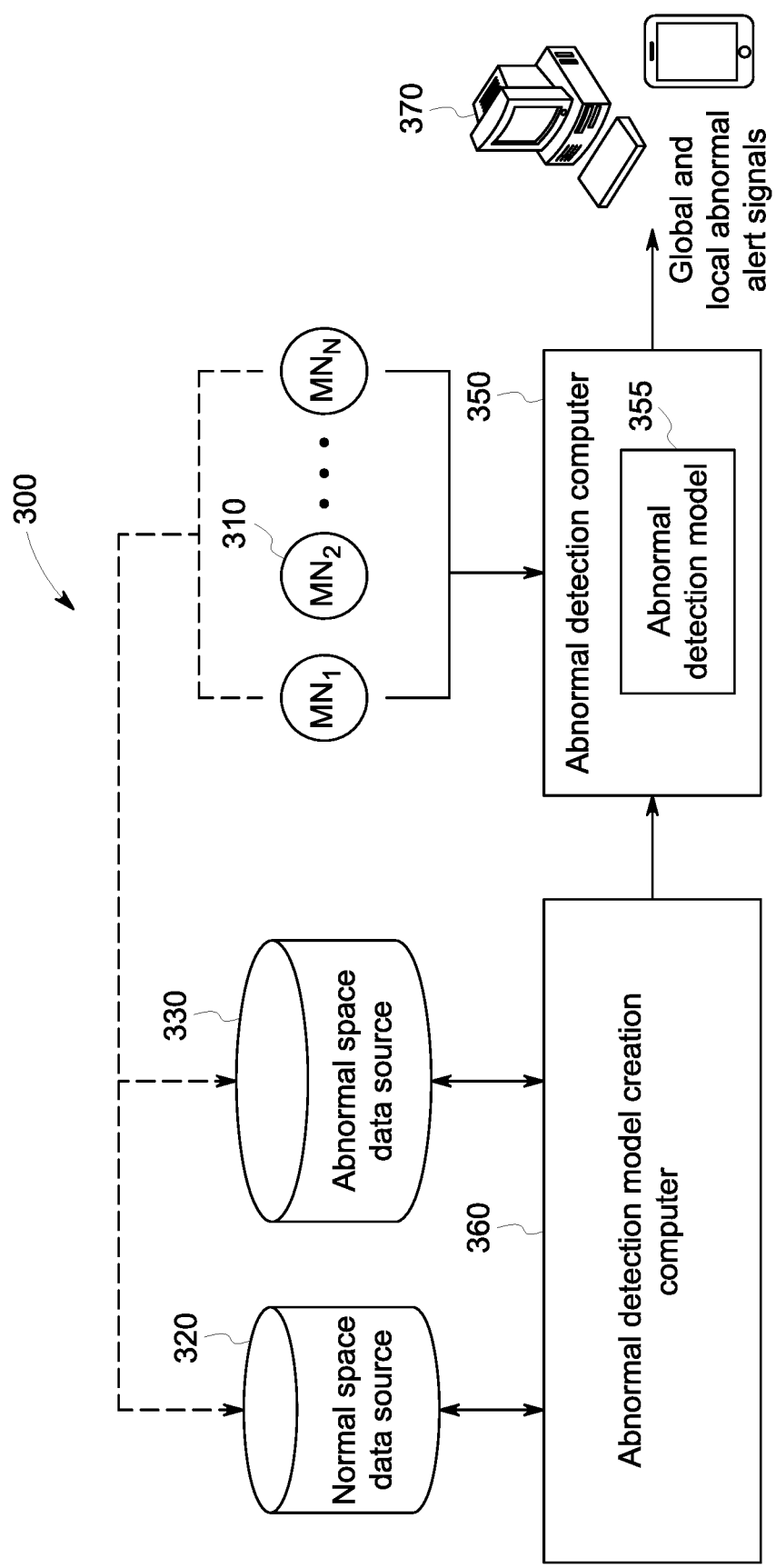
FIG. 3A is a high-level block diagram of a system that may be provided in accordance with some embodiments.

FIG. 1A is a high-level block diagram of a system 100 that may be provided in accordance with some embodiments. The system 100 includes monitoring nodes 110, such as sensors, actuators and controller parameters that generate a series of current monitoring node values 112 over time that represent a current operation of a cyber-physical system (e.g., an industrial asset). The system 100 may also include an abnormal detection computer platform 150, a global status determination module 120, a local status determination model 130 and an adaptive threshold 140 provided by an adaptive thresholding system 145. Each of the determination modules 120,130 may have a respective detection model associated therewith (e.g., abnormal detection model 355 (FIG. 3A). As described with respect to FIGS. 3A through 14, a global status determination module 120 and local status determination module 130 of the abnormal detection computer platform 150 may generate "abnormality" decisions based on a comparison of feature vectors and/or monitoring node values 112, a decision boundary 122 (e.g., FIGS. 1B and 9) and the adaptive threshold 140. In particular, the global status determination module 120 may generate a global status 124 indicating if the cyber-physical system is experiencing "normal" or "abnormal" operation based on the comparison of an anomaly score 126 (generated by the global status determination module) to the adaptive threshold 140 (generated by the adaptive thresholding system 145). The local status determination module 130 may generate, for each monitoring node, a local status 128 indicating if that monitoring node is experiencing "normal" or "abnormal" operation based the comparison of the anomaly score 132 (generated by the local status determination module 130) to the adaptive threshold 140.

Figure 1B:
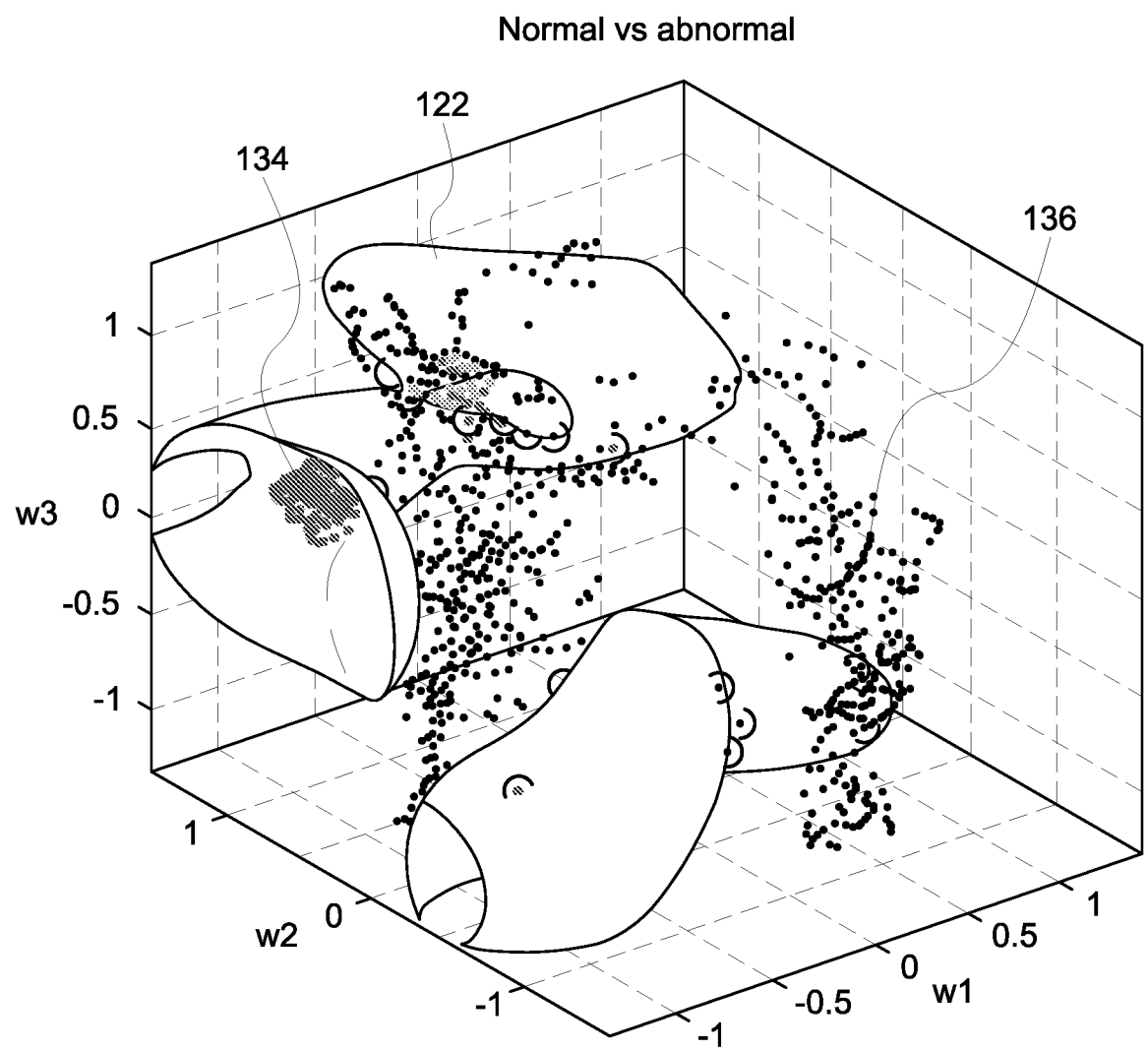
FIG. 1B is a model of a boundary provided in accordance with some embodiments.

FIG. 1B is an example of a decision boundary 122 in a 3D feature space, and the points inside 134 and outside 136 the decision boundary 122. The models are trained using simulation and/or historical field data to be used as anomaly decision boundaries. The decision boundary 122 may be a manifold in higher dimensional spaces, equal to the number of features being analyzed. The decision boundary 122 is a mathematical representation of a detection model 255 (a neural network, for example), as described further below.

Figure 2:
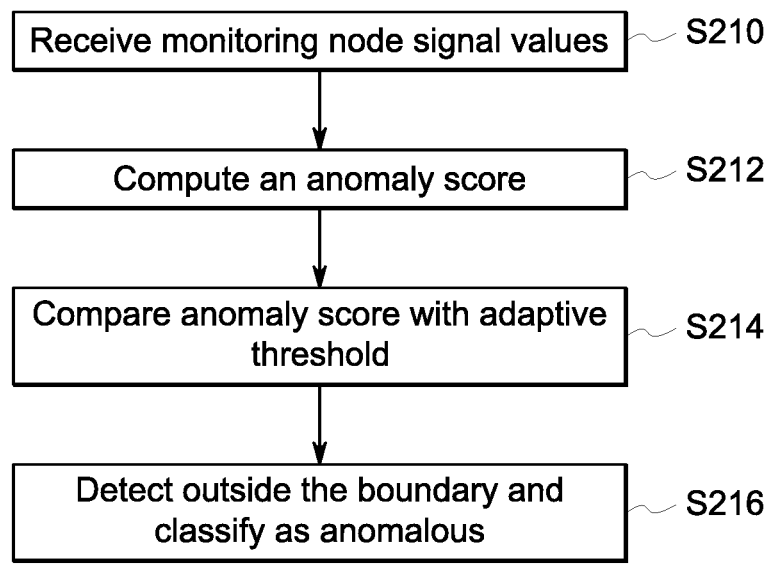
FIG. 2 is a method that may be provided in accordance with some embodiments.

FIG. 2 is a method that may be provided in accordance with some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, an abnormal detection computer platform 150 may receive from a plurality or real time monitoring nodes 110, monitoring node signal values 112.

Then at S212, the abnormal detection computer platform 150 may compute an anomaly score 132/126 for at least one of a given monitoring node 110 and the system 100, respectively. The anomaly score 132/126 may be computed via execution of the detection models 355 (FIG. 3A) of the respective determination modules 120, 130. The anomaly score 132/126 may indicate the probability the given monitoring node 110 and/or the system 100 is experiencing an anomaly at each time instance. The anomaly score 132/126 may be scaled from 0 to 1. As a non-exhaustive example, the closer (or alternatively, farther) the anomaly score is to 1, the more likely the node/system is experiencing an anomaly. Note that module 120 contains one detection model and uses one threshold for anomaly detection at the system level, but module 130 may contain one or more detection models and use one or more thresholds for anomaly location for each individual node (e.g., a separate model and threshold per node). The output 128 is a vector of anomaly statuses and the corresponding anomaly scores of each of the nodes.

At S214, the threat detection computer platform 150 may then compare the anomaly score 132/126 with the adaptive threshold 140. As mentioned above, for the local scores 132, there may be separate thresholds computed for each node by module 145. As described further above with respect to FIG. 1B, a decision boundary 122 is a mathematical representation of the detection model, such that the decision boundary 122 separates a normal state from an abnormal state for the monitoring node (with respect to the local status determination module) and for the system (with respect to the global status determination module). Embodiments may also include an additional turning parameter (threshold for the anomaly score). The distance and location of each point (in the feature space) is calculated with respect to the decision boundary 122 by computing the difference between the anomaly score 126/132 and the adaptive threshold 140. In a case the anomaly score 126/132 is bigger than the adaptive threshold 140, the point is outside the boundary 136, and hence, abnormal. The bigger the difference, the more the point is outside of the boundary 136 (the "more abnormal"). In a case the anomaly score 126/132 is smaller than the adaptive threshold 140, the point is inside the boundary 134, and hence, normal.

Next, at S216, the threat detection computer platform 150 may detect that one of a particular monitoring node and a system is outside the decision boundary 136 based on the comparison, and may then classify that particular monitoring node or system as being anomalous, respectively.

FIG. 3A is a high-level architecture of a system 300 in accordance with some embodiments. The system 300 may include monitoring node sensors 310 MNi through MNN, a "normal space" data source 320, and an "abnormal space" data source 330. The normal space data source 320 might store, for each of the plurality of monitoring nodes 310, a series of normal values over time that represent normal operation of a cyber-physical system (e.g., generated by a model or collected from actual sensor data as illustrated by the dashed line in FIG. 3A). The abnormal space data source 330 might store, for each of the monitoring nodes 310, a series of abnormal values that represent abnormal operation of the cyber-physical system (e.g., when the system is experiencing a cyber-attack or a fault).

Information from the normal space data source 320 and the abnormal space data source 330 may be provided to an abnormal detection model creation computer 360 that uses this data to create a decision boundary (that is, a boundary that separates normal behavior from threatened behavior). The decision boundary may then be used with the adaptive threshold 140 by an abnormal detection computer 350 executing an abnormal detection model 355. The abnormal detection model 355 may, for example, monitor streams of data from the monitoring nodes 310 comprising data from sensor nodes, actuator nodes, and/or any other critical monitoring nodes (e.g., sensor/actuator/controller nodes MNi through MNN) and automatically output global and local abnormal alert signal to one or more remote monitoring devices 370 when appropriate (e.g., for display to an operator or to have the global and local information fused in accordance with any of the embodiments described herein). As used herein, the term "automatically" may refer to, for example, actions that can be performed with little or no human intervention. According to some embodiments, information about detected threats may be transmitted back to a cyber-physical system control system.

As used herein, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The abnormal detection model creation computer 360 may store information into and/or retrieve information from various data stores, such as the normal space data source 320 and/or the abnormal space data source 330. The various data sources may be locally stored or reside remote from the abnormal detection model creation computer 360. Although a single abnormal detection model creation computer 360 is shown in FIG. 3, any number of such devices may be included. Moreover, various devices described herein might be combined according to embodiments of the present invention. For example, in some embodiments, the abnormal detection model creation computer 360 and one or more data sources 320, 330 might comprise a single apparatus. The abnormal detection model creation computer 360 functions may be performed by a constellation of networked apparatuses, in a distributed processing or cloud-based architecture.

A user may access the system 300 via one of the monitoring devices 370 (e.g., a Personal Computer ("PC"), tablet, or smartphone) to view information about and/or manage threat information in accordance with any of the embodiments described herein. In some cases, an interactive graphical display interface may let a user define and/or adjust certain parameters (e.g., abnormal detection trigger levels, other triggers, etc.) and/or provide or receive automatically generated recommendations or results from the abnormal detection model creation computer 360 and/or abnormal detection computer 350.

Thus. some embodiments described herein may use time series data from one or more monitoring nodes 310 from a physical (i.e., industrial or enterprise) asset and provide a reliable abnormality detection with low false positive rate. The system may extract features from the time series data for each monitoring node. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. The type and number of features for each monitoring node might be optimized using domain-knowledge and/or a feature discovery process. The features may be, for example, calculated over a sliding window with consecutive samples of specified duration from time series data. The length of the window and the duration of overlap for each batch may be determined from domain knowledge and an inspection of the data or using batch processing. Note that features may be computed at the local level (associated with each monitoring node) and the global level (associated with all the monitoring nodes, i.e., the whole asset). The time-domain values of the nodes or their extracted features may be, according to some embodiments, normalized for better numerical conditioning.

Figure 3B:
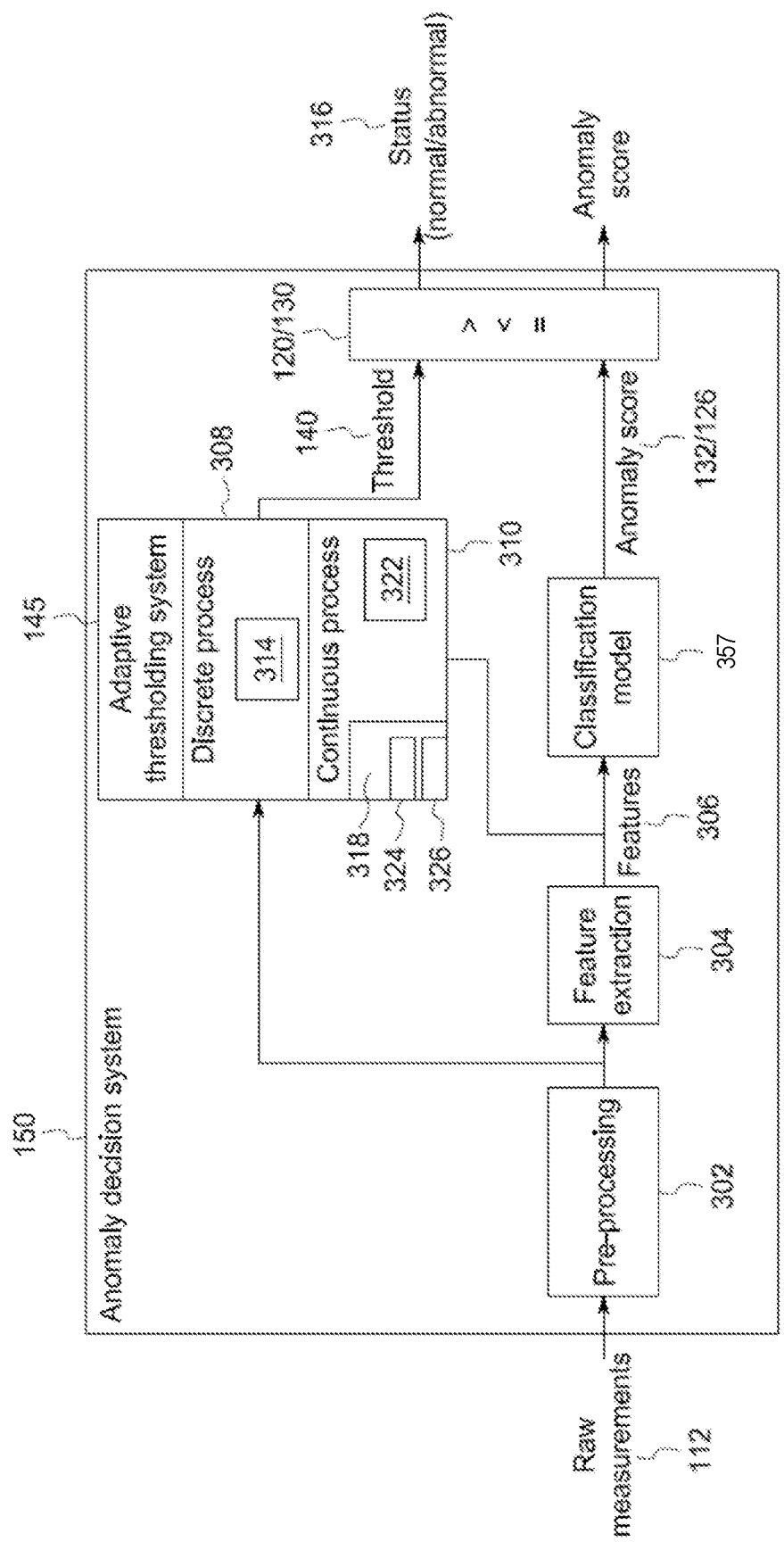
FIG. 3B is a block diagram of a system that may be provided in accordance with some embodiments.

FIG. 3B illustrates a block diagram including an adaptive thresholding system 145 according to some embodiments. The monitoring node raw values 112 may be received by the system 150, and in particular a data pre-processing module 302. The pre-processing module 302 may filter and/or smooth noisy data (e.g., to address gaps in the data, bad data, outliers, etc.). Next the pre-processed ("clean") data may be received by a feature extraction module 304. The feature extraction module 304 may generate a feature vector 306 for the current monitoring node using the current monitoring node signal values 112. Note the generation of the feature vector may include processing via one of feature transforms, identity transforms, and feature-based dynamic models. According to some embodiments, at least one of the current monitoring node feature vectors is associated with principal components, statistical features, deep learning features, frequency domain features, time series analysis features, logical features, geographic or position-based locations, and/or interaction features.

The feature vector 306 may be received by the classification models 357 of the global status determination module 120 and the local status determination module 120, as described above.

In some embodiments, the models 355 357 may be trained offline, as described above, such that when the models 355 357 are executed they output an anomaly score 132/126 for the monitoring node 110 or global system 100, respectively. Then, the determination modules 120, 130 may compare the anomaly score 132/126 with the adaptive threshold 140 to make an anomaly decision (classification) for the node/system (local detection/global detection) in real-time.

To determine whether a data point (for a node or system) is within the decision boundary or outside the decision boundary, conventional systems may compare the anomaly score output by the model with a single threshold value for that model, set during offline training. This single threshold value may be optimized offline, and may not be ideal for systems with model uncertainties and variations not captured in the training dataset. For example, the use of a single threshold may result in false positives and false negatives in the real-time operation environment due to factors including but not limited to, changes in operational or ambient conditions, controller and system mode changes, performance degradations, ageing of the equipment, etc. These real-time operation factors that occur in the field may not have been captured in simulation, or the available historical data meaning that when the single threshold was determined, these factors were not accounted for and there are gaps in the data to determine the threshold. Furthermore, setting a single threshold value for anomaly score for the entire operational space of the system, may result in a too conservative or too aggressive design. As a result of the gaps, when the models 355, 357 are deployed in the field, the determination modules 120, 130 may report an anomaly that is not an anomaly (false alarm) or may miss anomalies.

To address this, one or more embodiments provide an adaptive thresholding system 145 that does not change the abnormal detection model structure or feature calculation, but instead may provide an adaptive (changing) threshold 140 with which to compare the anomaly score 132/126. The adaptive threshold 140 may reduce the false positive/false negative rate. The adaptive threshold 140 may also provide a low-cost improvement to the detection/localization performance instead of a process to change the underlying models and whole decision boundary.

It is also noted that some embodiments may use a combination of approaches to calculate the adaptive threshold in which the adaptive threshold 140 comprises a sum of two terms—a course value that is determined offline (e.g., the single threshold) and a fine term that is calculated online, in real-time.

Figure 3C:
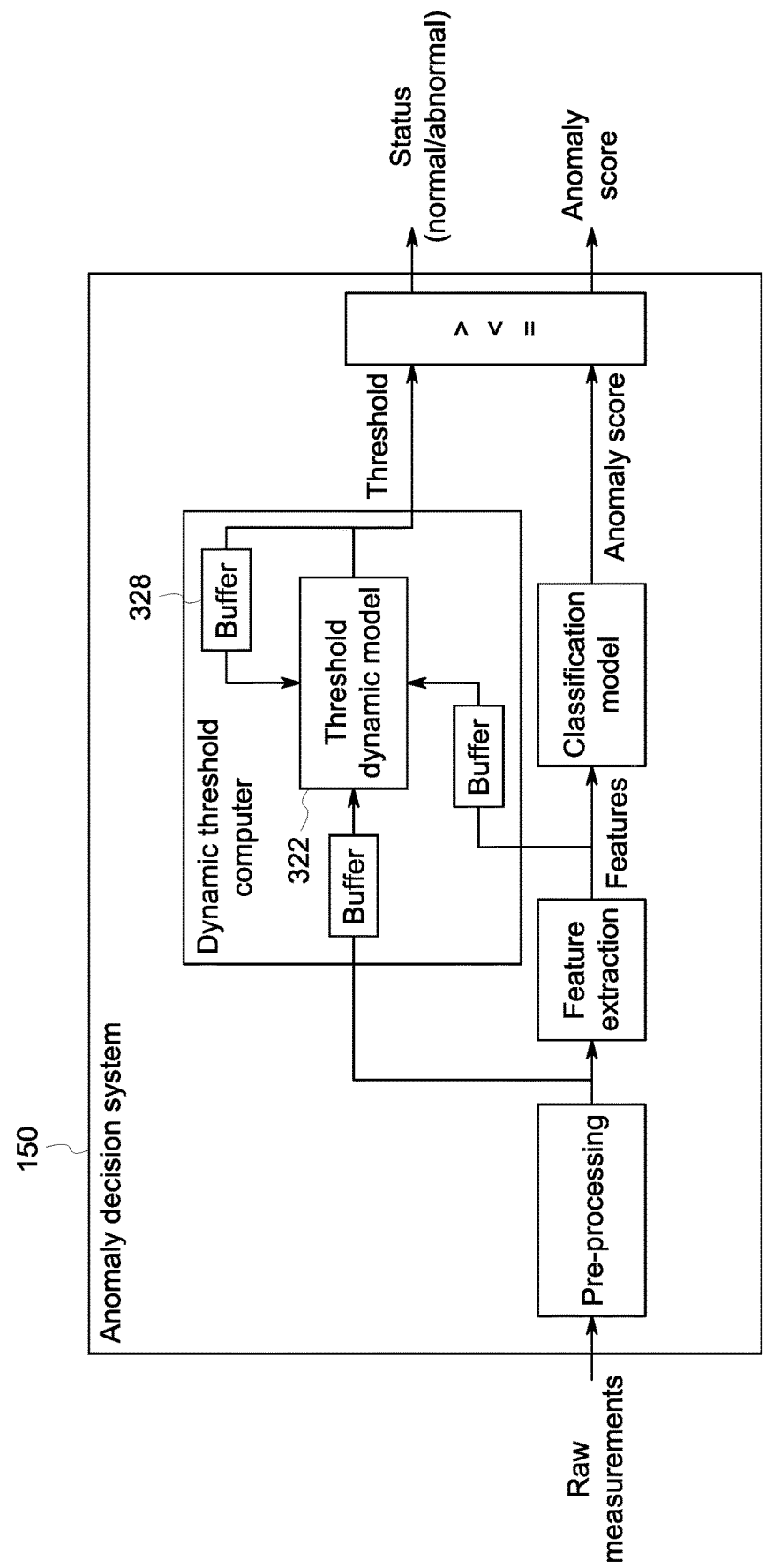
FIG. 3C is a block diagram of a system that may be provided in accordance with some embodiments.
Figure 3D:
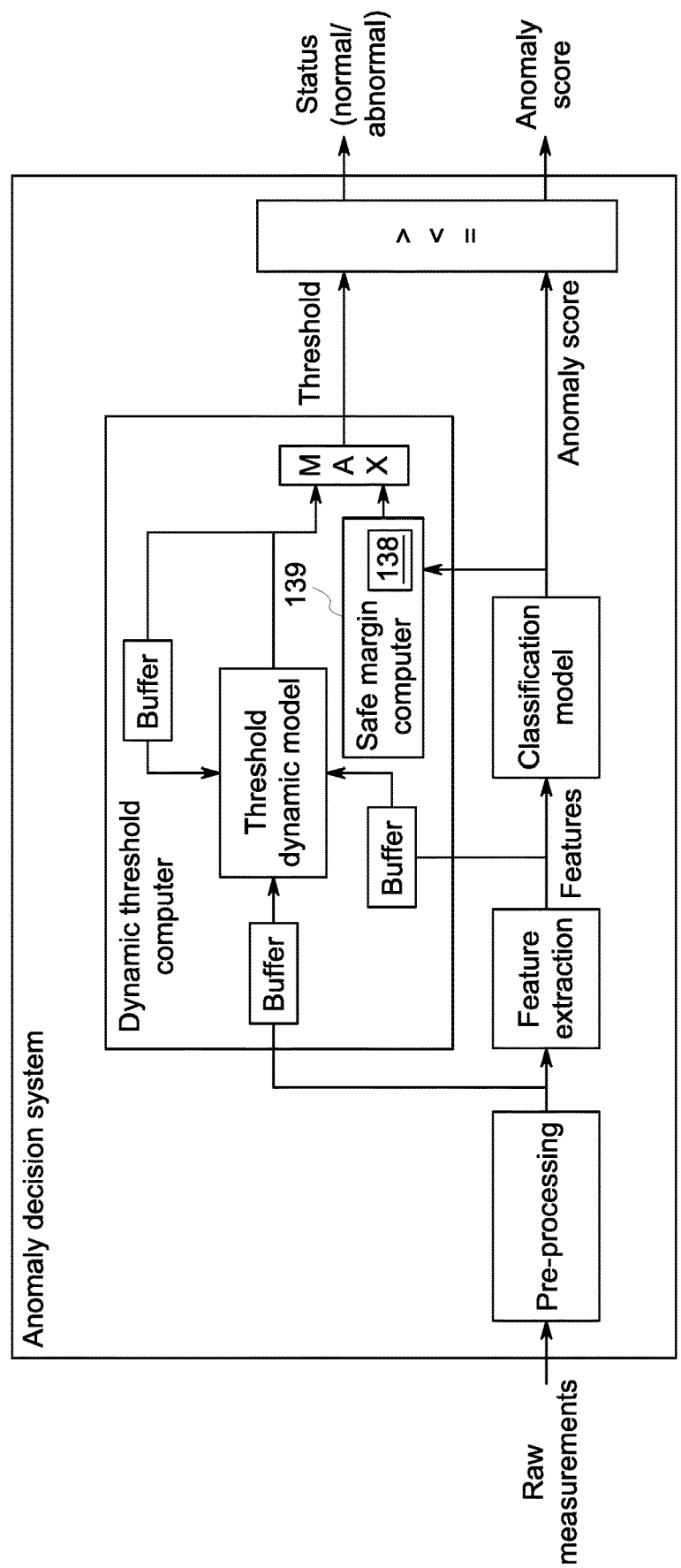
FIG. 3D is a block diagram of a system that may be provided in accordance with some embodiments.
Figure 3E:
FIG. 3E is a chart that may be provided in accordance with some embodiments.

The adaptive thresholding system 145 may apply either a discrete process 308 or a continuous process 310 to generate the adaptive threshold 140, as indicated in the chart 312 in FIG. 3E. The adaptive thresholding system 145 may select a process (308, 310) based on domain-knowledge of the operational space of the system, uncertainty quantification of the anticipated real-time operational and ambient variations, and the fidelity of the simulation system model used for training dataset generation.

The discrete process 308 may also be referred to as a "multi-level" threshold process. The discrete process 308 may quantize the threshold into multiple levels, where each level may correspond to a mode of operation, the region of operation, one or more ambient levels, weather event(s), etc. for the node/system. The multi-level thresholds may be computed using a rule-based logic or a machine learning, such as a decision tree. In this process 308, the threshold is switched among a finite (aka discrete) number of values. With this process 308, the adaptive threshold 140 applied to the anomaly score 126/132 may switch between the pre-set/ discrete threshold levels based on a trigger element 314 (i.e., the mode of operation, ambient level, etc.)). In one or more embodiments, the threshold levels associated with each trigger element 314 may be optimized offline as part of the model training process. As described above, the discrete process 308 may be applicable to both the signal space and feature space where the input variables to the abnormal detection computer 150 are raw data received from the nodes 110 after preprocessing (signal space) and feature vectors derived from the features (feature space).

As a non-exhaustive example, consider a gas turbine simulation. A gas turbine may operate in various system "modes" (e.g., based on system performance and environmental factors in the turbine). The control mode might be associated with normal power production, startup mode, spinning reserve, DLN-mode (for controlling NOx pollution), steady state modes, etc. When the gas turbine is operating in a steady state, the threshold used by the detection modules may be the same threshold as determined via the offline process, described above. The reason for this is because most of the time the gas turbine may be operating in a steady state, and as such the threshold is determined based on what is applicable most of the time. However, during normal operation of the gas turbine, there are some fast transients (i.e., a mode of operation of the system in which the dynamical behaviors of the system response are faster compared to the rest of the operation). Use of the offline threshold may result in these fast transients registering as false alarms (the comparison of the anomaly score for the fast transient data point as compared to the offline threshold may place the data point outside the boundary 136). In the instant example of the gas turbine, the gas turbine generates power, and most of the time the turbine operates in a constant steady state mode of operation with a constant output/power per the instructions of a controller with potentially slight fluctuations around the power command. During those times, the dynamics is constant—the system operates at a steady state. However, there are some other events that may trigger a fast response of the controller. For example, in addition to the power regulation, the controller for the gas turbine system may also regulate NOx (nitrous oxide) levels, as NOx is a pollutant that is released by the gas turbine. When the controller detects the amount of NOx is increasing beyond an acceptable level, the controller may place the gas turbine into another mode of operation that may quickly change the operation of the turbine (to not be a steady state mode of operation) to control the amount of NOx being released. This change may only be for a short amount of time (e.g., a few seconds) and may be considered a fast transient. This change issued by the operation of the controller may result in a change of the controller signals, which may register as a false alarm if the anomaly score associated with this signal is compared to the offline-determined threshold. However, this change in the mode of operation, as issued by the controller, is part of the normal operation of the gas turbine controller. For the gas turbine example, similar scenarios may happen different adjustments of the inlet bleed heating (IBH) by the controller.

According to some embodiments, the adaptive thresholding system 145 may store the different operations of the controller (e.g., steady state and fast transient) as different trigger elements 314, where each trigger element is associated with a respective discrete threshold level. In the instant example, threshold A may be used (e.g., an increased threshold) during the fast transient, and when the fast transient passes and the steady state returns—as indicated by a change in trigger element 314—threshold B (e.g., a lower threshold) may be used. In this way the trigger element 314 may be the input to the adaptive thresholding system 145 when there is a change in the operation of the system/node, which in turn outputs a corresponding adaptive threshold level 140. The determination modules 120, 130 may then compare the anomaly score 126/132 to this output adaptive threshold level 140 to classify 316 the node/system as normal or abnormal. It is noted that the determination modules 120/130 may also output the anomaly scores 126/ 132 separately to a user interface or other system.

It is noted that while the example described herein is with respect to a mode of operation (i.e., steady state vs fast transient), the trigger element 314 may be a change in an ambient condition (e.g., if a first temperature range, then trigger element A/threshold A, and if a second temperature range, then trigger element B/threshold B). As a non-exhaustive example, different thresholds may be provided for differences in the ambient condition corresponding to different levels of accuracy for the model used to train the offline boundary in the different conditions. Take for example temperature and gas turbines. The colder the temperature (and in particular, very cold temperatures), the more uncertain the model. As such, in one temperature range it may be desirable to use threshold A because it imparts a given accuracy, while in another temperature range, it may be desirable to use threshold B.

The continuous process 310 may not switch between a finite/pre-set number of values, as with the discrete process 308, but instead may generate any value that may be continuously adapted using one of a static model 318 or a dynamic model 320. The continuous process 310 may be a model-based approach in which modeling for the adaptive threshold 140 may become part of the abnormal detection model/module training.

Static Model

With respect to the static model 318 for an adaptive threshold 140, it is noted that while the threshold is changing, the underlying model (detection model 355) that governs the changes in the threshold is static. There are two non-exhaustive examples of static models that may be used to continuously change the adaptive threshold 140 in real-time: a threshold lookup table model 324 and a regression model 326. The threshold lookup table model 324 is itself constant, but it may be used in real time to calculate the latest value of the adaptive threshold 140. The threshold lookup table model 324 may determine the adaptive threshold 140 in real-time by using a pre-stored lookup table that is computed offline. The pre-stored lookup table may include input parameters and adaptive thresholds 140. The input parameters (raw values from the nodes, calculated features (e.g., mean, standard deviation, etc.) or feature vectors from the features) in the lookup table may be determined offline as part of the training process for the abnormal detection models 355. The adaptive thresholding system 145 may receive the input parameters at the threshold lookup model 324 and execute the threshold lookup model 324 to output the adaptive threshold 140. It is noted that in one or more embodiments, the threshold lookup model 324 may perform an interpolation operation in a case the input parameters result in an output that is between adaptive thresholds 140.

With respect to the regression model 326 for an adaptive threshold, the regression model 326 is a machine learning model that is trained not for anomaly detection, but instead to learn the adaptive threshold. Any suitable machine learning method may be used, including but not limited to linear regression, polynomial models, generalized linear model, extreme learning machine (ELM) regression and deep neural networks. The regression model 326 is trained offline as a function of preprocessed raw signals (monitoring node values) or features or a combination of both. The regression model 326 is pre-stored, as is the lookup table model 324, and evaluated in real-time to change the adaptive threshold 140 based on the received values of its inputs (i.e., the independent variable in the regression model).

It is noted that in instances of the discrete/multi-level process or continuous process with a static model, only the current-time values of the inputs may be used to compute the adaptive threshold 140.

Dynamic Model

FIG. 3C shows the same architecture as FIG. 3B, except that the dynamic model 322 is used here and may include a plurality of buffers 328. The dynamic model 322 may be a time-series model of the adaptive threshold that not only considers the current values of the input variables, but also considers previous values of the input variables and previous thresholds to calculate a current value for the adaptive threshold 140. This is different from the static model 318, which only considers the current input value in determination of a current adaptive threshold 140. Non-exhaustive examples of the dynamic model 322 may be dynamic data driven models such as VAR, ARX, ARMA, ARMAX, ARIMA, ARIMAX, exponential smoothers, or any other suitable model that may be used to generate the adaptive threshold 140 in real time. The buffers 328 stack and provide both the current value as well as the previous values of the inputs required by the dynamic threshold model. The dynamic model 322 may also be nonlinear, such as NARX, NARMAX or a recurrent neural network (RNN). Any combination of the current or previous values of the pre-processed raw measurements, features or threshold may be used to compute the updated value of the adaptive threshold 140. The order of the model 322 (i.e., the number of lags/previous values) may be determined using AIC or BIC criteria, or through the process of learning (e.g., when using an RNN).

As noted before, the adaptive threshold system 145 computes thresholds both the for the global detection and the localization modules (e.g., one threshold per each node). Each of these thresholds may be computed using any of the described methods and model types.

In determining the adaptive threshold 140, it is noted that it may be undesirable to have the adaptive threshold 140 be a value that is close to what is considered "normal". The reason for this is that if the adaptive threshold is too close to a normal value, if the node/system experiences a little bit of variation from normal, the values may pass the adaptive threshold and create false alarms in the output of the determination module 120/130. To ensure a safe distance between the adaptive threshold and a distribution of the anomaly score 126/132, one or more embodiments use a safe margin rule 138 provided by a safe margin computer 139 at the adaptive thresholding system 145 when generating the adaptive threshold 140, as shown in FIG. 3D. It is noted that while the safe margin computer 139 is shown in FIG. 3D along side the dynamic threshold model, it works similarly for other adaptive threshold computation processes as well. The safe margin rule 138 may enforce the generation of an adaptive threshold 140 that remains reasonably above the normal fluctuations of the anomaly score 126/132 when the system/node status is normal. The safe margin rule 138 may be based on the current and previous values of the anomaly scores 126/132. The safe margin rule 138 may set a distance between the adaptive threshold and the normal variations of the anomaly score via a data-driven process 142 and a model-based process 144. Other suitable processes to set the distance may be used. The process may be selected based on the anomaly detection system accuracy (false positive and false negative rates) requirements, the online computational power available and available amount of the simulated or historical anomaly scores for the system (to build a model to predict the anomaly score, in the model-based approach).

With both the data-driven process 142 and the model-based process 144, the adaptive threshold 140 may be set as a maximum of the value coming from the adaptive thresholding method used and a value set to satisfy a minimum distance to the anomaly score 126/132.

The data-driven process 142 may compute at least one of a mean, standard deviation, and extreme values for the anomaly score online/in real-time over a sliding window. During simulation, it may be shown that there are variations in the anomaly score. As such, a range of the normal distribution of the anomaly score may be calculated. The safe margin rule 138 may then be calculated based on that normal distribution. As a non-exhaustive example, as long as the status of the system/node remains normal during the time window, the safe margin rule 138 may set the adaptive threshold 140 to be at least three standard deviations away from the mean calculated for the anomaly score.

The model-based process 144 may use a time-series model for the anomaly score to predict the anomaly score in the next time instance (which may be a different time-series model than used for determining the adaptive threshold, as discussed above). The time-series model for the anomaly score may be an offline-trained model or an online model, such as an exponential smoother. The residue between an output of the one-step prediction provided by the model (predicted anomaly score based on previous scores) and the actual next-step score (anomaly score) may be considered as an innovation signal. It is noted that the prediction may use a Gaussian distribution or any other continuous distribution, which may be determined by fitting the anomaly scores to a statistical distribution during the offline training. Based on the selected distribution for the anomaly score, a confidence interval may be computed. As a non-exhaustive example, for a Gaussian distribution, the innovation signal covariance may be used to calculate the 99% or 95% (or other suitable percentage) confidence bounds (i.e., percent confidence the anomaly score will be in this upper and lower limit) for the safe margin rule 138 using a $X^2$ distribution, such that the adaptive threshold 140 must be outside of this bound.

In some embodiments, the safe margin rule may be based on a combination of the data-driven process 142 and the model-based process 144. For example, safe margins for localization for some of the nodes may be set using the data-driven process 142 and some other nodes using the model-based process 144.

Figure 4:
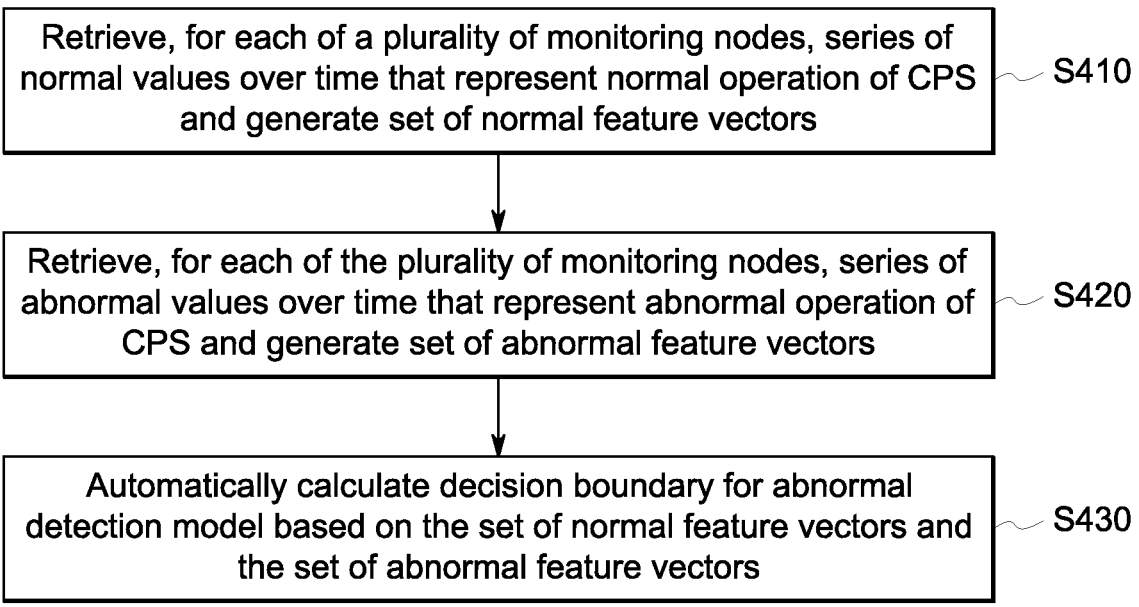
FIG. 4 is a model creation method according to some embodiments.

FIG. 4 illustrates a model creation method that might be performed by some or all of the elements of the system 300 described with respect to FIG. 3A. At S410, the system may retrieve, for each of a plurality of monitoring nodes (e.g., sensor nodes, ac, controller nodes, etc.), a series of normal values over time that represent normal operation of the Cyber-Physical System ("CPS") and a set of normal feature vectors may be generated. Similarly, at S420 the system may retrieve, for each of the plurality of monitoring nodes, a series of abnormal (e.g., attacked) values over time that represent an abnormal operation of the cyber-physical system and a set of abnormal feature vectors may be generated. The series of normal and/or abnormal values might be obtained, for example, by running Design of Experiments ("DoE") on a cyber-physical system. At S430, a decision boundary may be automatically calculated for an abnormal detection model based on the set of normal feature vectors and the set of abnormal feature vectors. According to some embodiments, the decision boundary might be associated with a line, a hyperplane, a non-linear boundary separating normal space from threatened space, and/or a plurality of decision boundaries. Moreover, a decision boundary might comprise a multi-class decision boundary separating normal space, attacked space, and degraded operation space (e.g., when a sensor fault occurs). In addition, note that the abnormal detection model might be associated with the decision boundary, feature mapping functions, and/or feature parameters.

Figure 5:
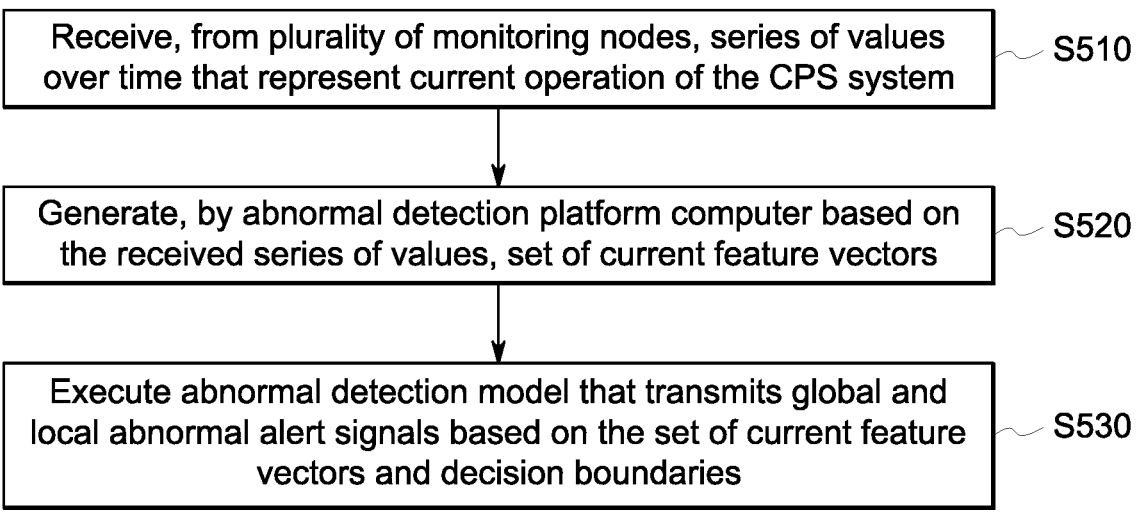
FIG. 5 is an abnormal alert method according to some embodiments.

The decision boundary can then be used to detect abnormal operation (e.g., as might occur during cyber-attacks). For example, FIG. 5 is an abnormal alert method according to some embodiments. At S510, the system may receive, from a plurality of monitoring nodes, a series of current values over time that represent a current operation of the cyber-physical system. At S520, an attack detection platform computer may then generate, based on the received series of current values, a set of current feature vectors. At S530, an abnormal detection model may be executed to transmit an abnormal alert signal based on the set of current feature vectors, an anomaly score 126/132, the adaptive threshold 140 and a decision boundary when appropriate (e.g., when a cyber-attack is detected). According to some embodiments, one or more response actions may be performed when an abnormal alert signal is transmitted. For example, the system might automatically shut down all or a portion of the cyber-physical system (e.g., to let the detected potential cyber-attack be further investigated). As other examples, one or more parameters might be automatically modified, a software application might be automatically triggered to capture data and/or isolate possible causes, etc.

Some embodiments described herein may take advantage of the physics of a control system by learning a priori from tuned high-fidelity equipment models and/or actual "on the job" data to detect single or multiple simultaneous adversarial threats to the system. Moreover, according to some embodiments, all monitoring node data may be converted to features using advanced feature-based methods, and the real-time operation of the control system may be monitored in substantially real-time. Abnormalities may be detected by classifying the monitored data as being "normal" or disrupted (or degraded). This decision boundary may be constructed using dynamic models and may help enable early detection of vulnerabilities (and potentially avert catastrophic failures) allowing an operator to restore the control system to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines or machine learning techniques) may be used to generate decision boundaries. Since boundaries may be driven by measured data (or data generated from high-fidelity models), defined boundary margins may help to create an abnormal zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account on operator's knowledge about system operation (e.g., the differences between normal and abnormal operation).

Figure 6:
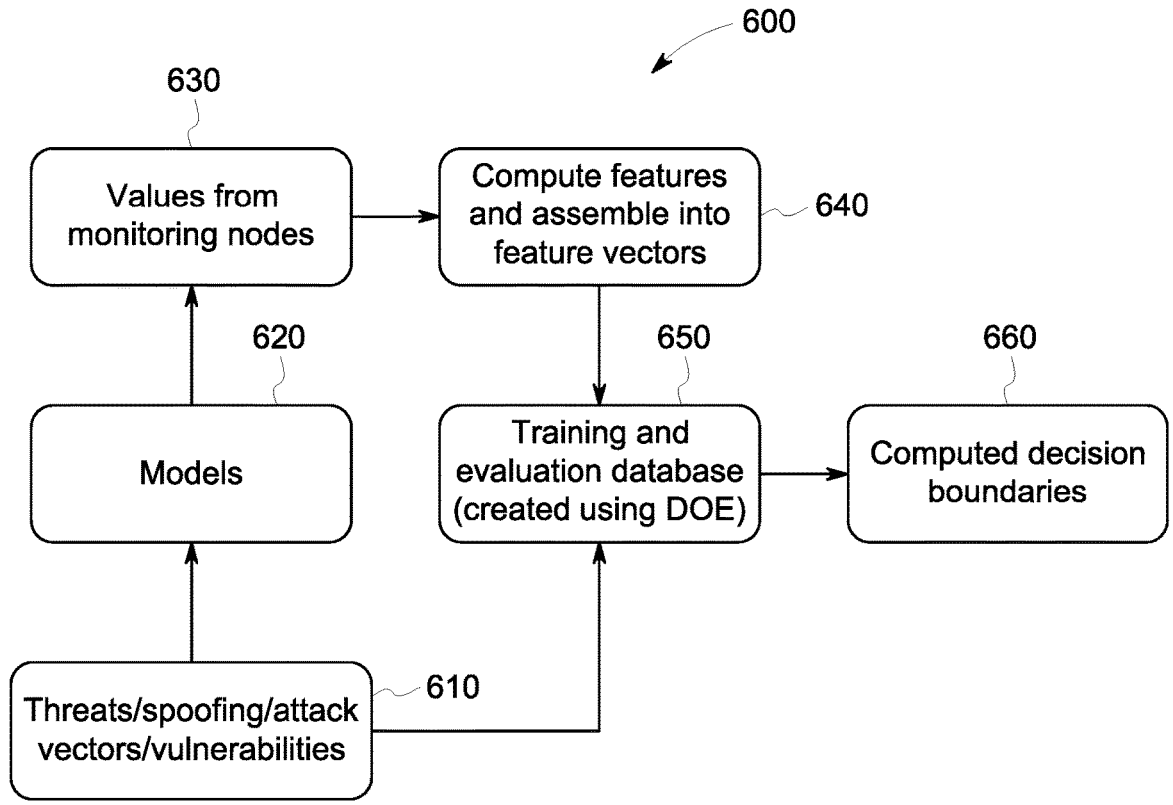
FIG. 6 illustrates an off-line process in accordance with some embodiments.

FIG. 6 illustrates an off-line boundary creation process 600 in accordance with some embodiments. Information about threats, spoofing, attack vectors, vulnerabilities, etc. 610 may be provided to models 620 and/or a training and evaluation database 650 created using DoE techniques. The models 620 may, for example, simulate data 630 from monitoring nodes to be used to compute features that are assembled into a feature vector 640 to be stored in the training and evaluation database 650. The data in the training and evaluation database 650 may then be used to compute decision boundaries 660 to distinguish between normal operation and abnormal operation. According to some embodiments, the process 600 may include a prioritization of monitoring nodes and anticipated attack vectors to form one or more data sets to develop decision boundaries. Attack vectors are abnormal values at critical inputs where malicious attacks can be created at the domain level that will make the system go into threatened/abnormal space. In addition, the models 620 may comprise high-fidelity models that can be used to create a data set (e.g., a set that describes threat space as "levels of threat conditions in the system versus quantities from the monitoring nodes"). The data 630 from the monitoring nodes might be, for example, quantities that are captured for a length of from 60 to 80 seconds from sensor nodes, actuator nodes, and/or controller nodes (and a similar data set may be obtained for "levels of normal operating conditions in the system versus quantities from the monitoring nodes"). This process will result in data sets for "abnormal space" and "normal space." The 60 to 80 seconds long quantities may be used to compute features 640 using feature engineering to create feature vectors. These feature vectors can then be used to obtain a decision boundary that separates the data sets for abnormal space and normal space (used to detect an anomaly such as a cyber-attack).

Since attacks might be multi-prong (e.g., multiple attacks might happen at once), DoE experiments may be designed to capture the attack space (e.g., using full factorial, Taguchi screening, central composite, and/or Box-Behnken). When models are not available, these DoE methods can also be used to collect data from real-world asset control systems. Experiments may run, for example, using different combinations of simultaneous attacks. Similar experiments may be run to create a data set for the normal operating space. According to some embodiments, the system may detect "degraded" or faulty operation as opposed to a threat or attack. Such decisions may require the use of a data set for a degraded and/or faulty operating space.

Figure 7:
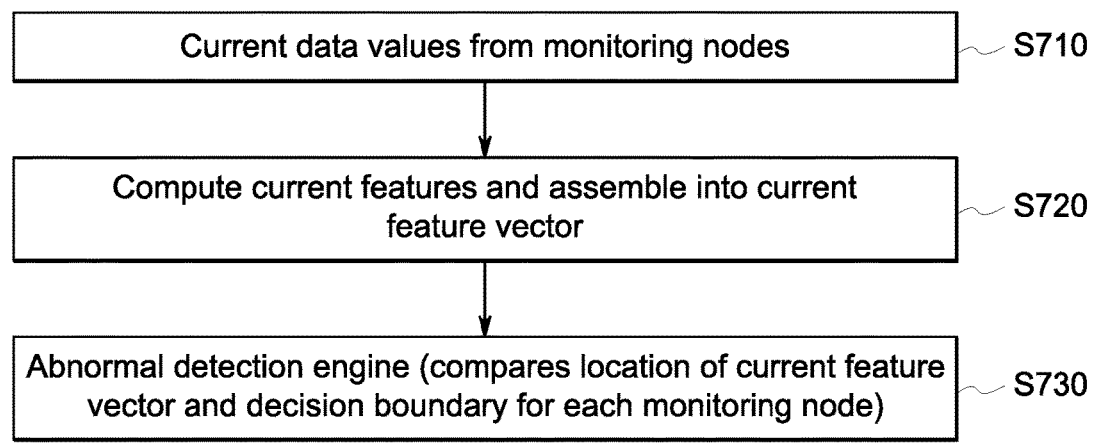
FIG. 7 illustrates a real-time process according to some embodiments.

FIG. 7 illustrates a real-time process to protect a cyber-physical system according to some embodiments. At S710, current data from monitoring nodes may be gathered (e.g., in batches of from 60 to 80 seconds). At S720, the system may compute features and form feature vectors. For example, the system might use weights from a principal component analysis as features. At S730, an abnormal detection engine may compare location of feature vectors to a decision boundary to make a determination (and output an abnormal signal if necessary). As described above, the location of the feature vectors (relative to the decision boundary) may be based on the computed difference between the anomaly score 126/132 and the adaptive threshold 140. According to some embodiments, monitoring node data from models (or from real systems) may be expressed in terms of features since features are a high-level representation of domain knowledge and can be intuitively explained. Moreover, embodiments may handle multiple features represented as vectors and interactions between multiple sensed quantities might be expressed in terms of "interaction features."

Note that, as described above, many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Figure 8:
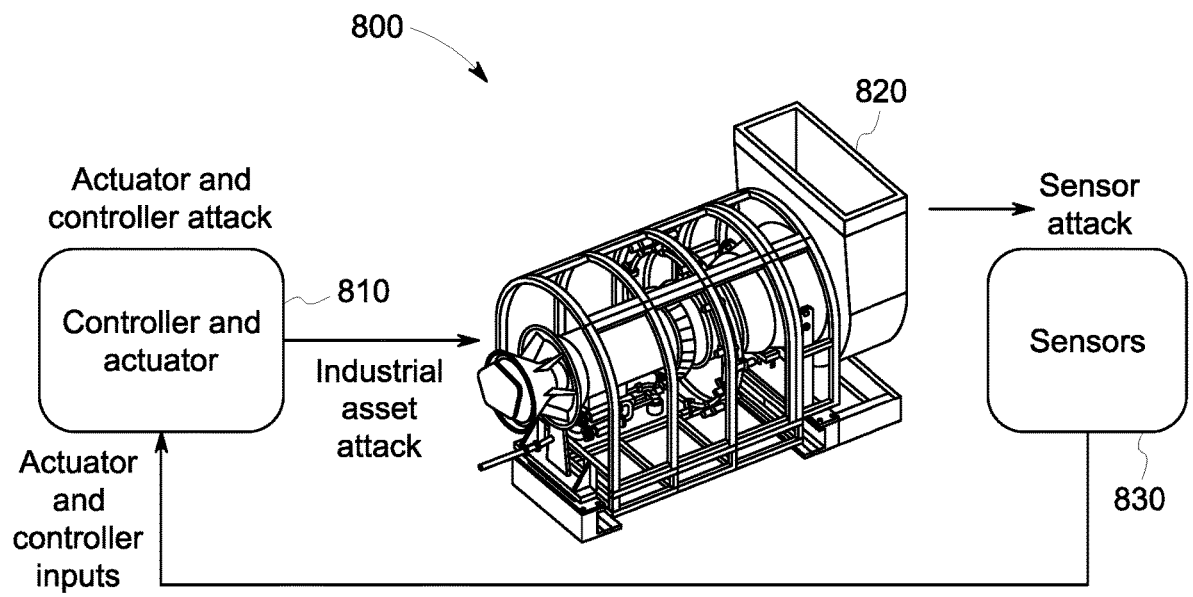
FIG. 8 is an example associated with a cyber-physical system engine in accordance with some embodiments.

FIG. 8 is an example 800 associated with a cyber-physical system in accordance with some embodiments. In particular, the example includes a controller and actuator portion 810 subject to actuator and controller attacks, a gas turbine portion 820 subject to state attacks, and sensors 830 subject to sensor attacks. By way of examples only, the sensors 830 might comprise physical and/or virtual sensors associated with temperatures, airflows, power levels, etc. The actuators might be associated with, for example, motors. By monitoring the information in the cyber-physical system, a threat detection platform may be able to detect cyber-attacks (e.g., using feature vectors and a decision boundary) that could potentially cause a large amount of damage.

Figure 9:
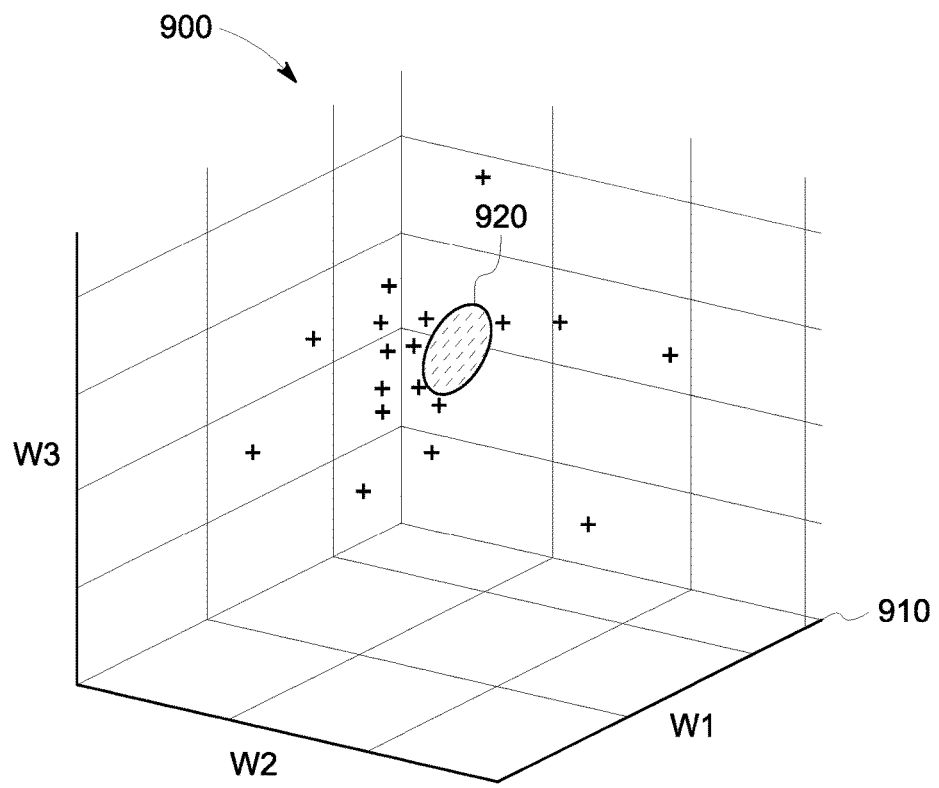
FIG. 9 illustrates three dimensions of sensor outputs in accordance with some embodiments.
Figure 10:
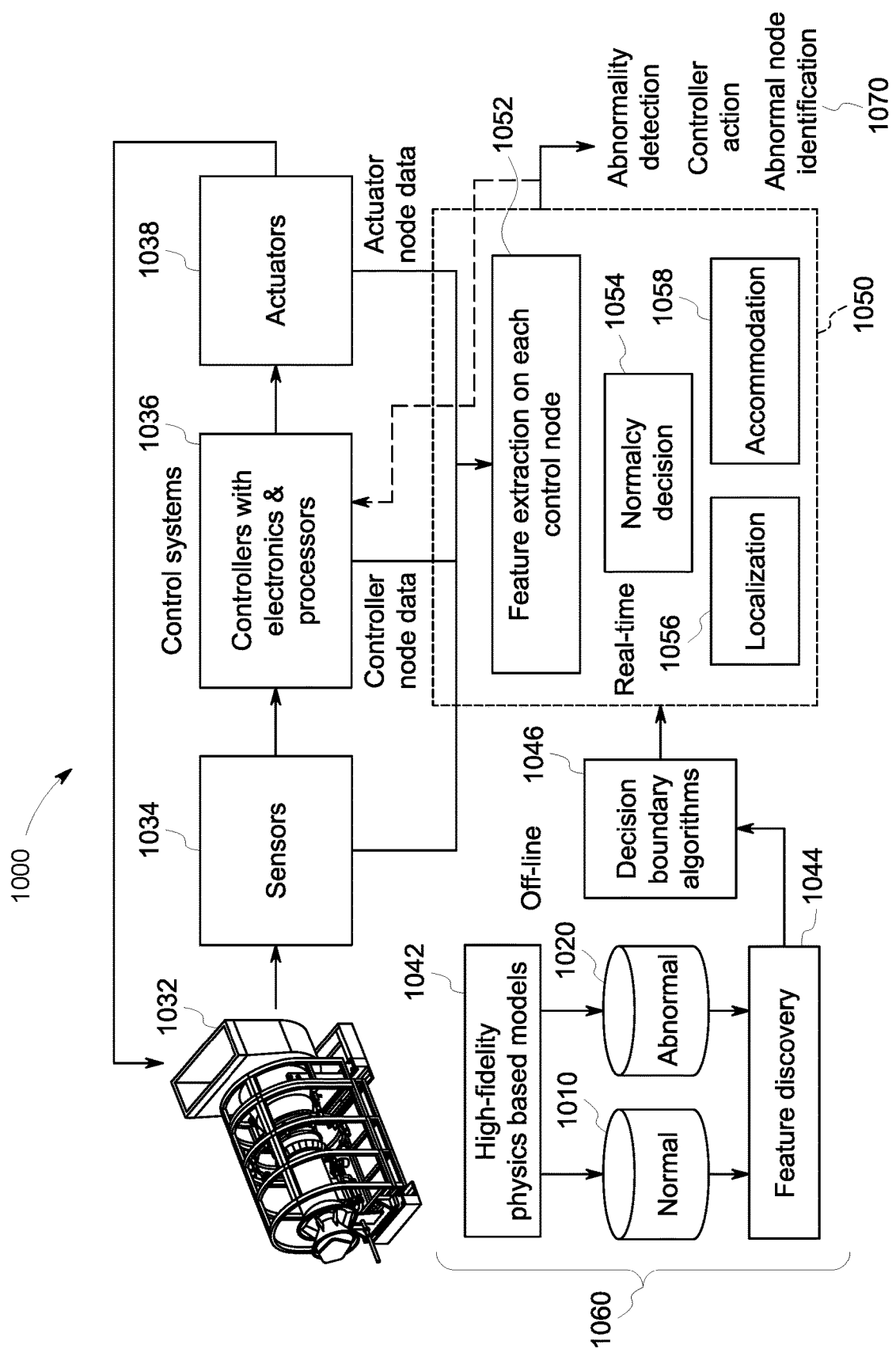
FIG. 10 is an abnormal alert system according to some embodiments.

FIG. 9 illustrates 900 three dimensions of monitoring node outputs in accordance with some embodiments. In particular, a graph 910 plots monitoring node outputs ("+") in three dimensions, such as dimensions associated with Principal Component Features ("PCF"): w1, w2, and w3. Moreover, the graph 910 includes an indication of a normal operating space decision boundary 920. Although a single contiguous boundary 920 is illustrated in FIG. 9, embodiments might be associated with multiple regions. Note that PCF information may be represented as weights in reduced dimensions. For example, data from each monitoring node may be converted to low dimensional features (e.g., weights). According to some embodiments, monitoring node data is normalized as follows:

$$S_{normalized}(k) = \frac{S_{nominal}(k) - S_{original}(k)}{\overline{S}_{nominal}}$$

where S stands for a monitoring node quantity at "k" instant of time. Moreover, output may then be expressed as a weighted linear combination of basis functions as follows:

$$S = S_0 + \sum_{j=1}^{N} w_j \Psi_j$$

where $S_0$ is the average monitoring node output with all threats, $w_j$ is the $j^{th}$ weight, and $\Psi_j$ is the $j^{th}$ basis vector. According to some embodiments, natural basis vectors are obtained using a covariance of the monitoring nodes' data matrix. Once the basis vectors are known, weight may be found using the following equation (assuming that the basis sets are orthogonal):

$$w_j(S-S_0)^T \Psi_j$$

Note that weights may be an example of features used in a feature vector.

Thus, embodiments may enable the passive detection of indications of multi-class abnormal operations using real-time signals from monitoring nodes. Moreover, the detection framework may allow for the development of tools that facilitate proliferation of the invention to various systems (e.g., turbines) in multiple geolocations. According to some embodiments, distributed detection systems enabled by this technology (across multiple types of equipment and systems) will allow for the collection of coordinated data to help detect multi-prong attacks. Note that the feature-based approaches described herein may allow for extended feature vectors and/or incorporate new features into existing vectors as new learnings and alternate sources of data become available. As a result, embodiments may detect a relatively wide range of cyber-threats (e.g., stealth, replay, covert, injection attacks, etc.) as the systems learn more about their characteristics. Embodiments may also reduce false positive rates as systems incorporate useful key new features and remove ones that are redundant or less important. Note that the detection systems described herein may provide early warning to cyber-physical system operators so that an attack may be thwarted (or the effects of the attack may be blunted), reducing damage to equipment.

According to some embodiments, a system may further localize an origin of a threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in a threat alert signal.

Some embodiments of the algorithm may utilize feature-based learning techniques based on high-fidelity physics models and/or machine operation data (which would allow the algorithm to be deployed on any system) to establish a high dimensional decision boundary. As a result, detection may occur with more precision using multiple signals, making the detection more accurate with less false positives. Moreover, embodiments may detect multiple attacks on control signals, and rationalize where the root cause attack originated. For example, the algorithm may decide if a signal is anomalous because of a previous signal attack, or if it is instead independently under attack. This may be accomplished, for example, by monitoring the evolution of the features as well as by accounting for time delays between attacks.

A cyber-attack detection and localization algorithm may process a real-time cyber-physical system signal data stream and then compute features (multiple identifiers) which can then be compared to the signal-specific decision boundary or the preprocessed raw signals which can then be compared to the signal-specific decision boundary. A block diagram of a system 1000 utilizing a signal-specific cyber-physical system abnormality detection and localization algorithm according to some embodiments is provided in FIG. 10. In particular, as a non-exhaustive example, a gas turbine 1032 provides information to sensors 1034 which helps controllers with electronics and processors 1036 adjust actuators 1038. A threat detection system 1060 may include one or more high-fidelity physics-based models 1042 or a data-driven model associated with the turbine 1032 to create normal data 1010 and/or abnormal data 1020. The normal data 1010 and abnormal data 1020 may be accessed by a feature discovery component 1044 and processed by decision boundary algorithms 1046 while off-line (e.g., not necessarily while the gas turbine 1032 is operating). The decision boundary algorithms 1046 may generate an abnormal model including decision boundaries for various monitoring nodes. Each decision boundary may separate two data sets in a high dimensional space which is constructed by running a binary classification algorithm, such as a support vector machine using the normal data 1010 and abnormal data 1020 for each monitoring node signal (e.g., from the sensors 1034, controllers 1036, and/or the actuators 1038).

A real-time threat detection platform 1050 may receive the boundaries along with streams of data from the monitoring nodes. The platform 1050 may include a feature extraction on each monitoring node element 1052 and a normalcy decision 1054 with an algorithm to detect attacks in individual signals using signal specific decision boundaries and adaptive thresholds, as well rationalize attacks on multiple signals, to declare which signals were attacked (or are otherwise abnormal), and which became anomalous due to a previous attack on the system via a localization module 1056. An accommodation element 1058 may generate outputs 1070, such as an anomaly decision indication (e.g., an abnormal) alert signal), a controller action, and/or a list of abnormal monitoring nodes.

During real-time detection, contiguous batches of control signal data may be processed by the platform 1050, normalized and the feature vector extracted. The location of the vector for each signal in high-dimensional feature space (the location determined via the comparison of an anomaly score for the vector to an adaptive threshold) may then be compared to a corresponding decision boundary. If it falls within the abnormal region, then a cyber-attack may be declared. The algorithm may then make a decision about where the attack originally occurred. An attack may sometimes be on the actuators 1038 and then manifested in the sensor 1034 data. Attack assessments might be performed in a post decision module (e.g., the localization element 1056) to isolate whether the attack is related to the sensor, controller, or actuator (e.g., indicating which part of the monitoring node). This may be done by individually monitoring, overtime, the location of the feature vector with respect to the hard decision boundary. For example, when a sensor 1034 is spoofed, the attacked sensor feature vector will cross the hard decision boundary earlier than the rest of the vectors as described with respect to FIGS. 11 through 13. If a sensor 1034 is declared to be anomalous, and a command to the auxiliary equipment is later determined to be anomalous, it may be determined that the original attack, such as signal spoofing, occurred on the sensor 1034. Conversely, if the signal to the auxiliary equipment was determined to be anomalous first, and then later manifested in the sensor 1034 feedback signal, it may be determined that the signal to the equipment was initially attacked.

According to some embodiments, it may be detected whether or not a signal is in the normal operating space (or abnormal space) through the use of localized decision boundaries, real-time computation of the specific signal features, and adaptive thresholds 140. Moreover, an algorithm may differentiate between a sensor being attacked as compared to a signal to auxiliary equipment being attacked. The control intermediary parameters and control logical(s) may also be analyzed using similar methods. Note that an algorithm may rationalize signals that become anomalous. An attack on a signal may then be identified.

Figure 11:
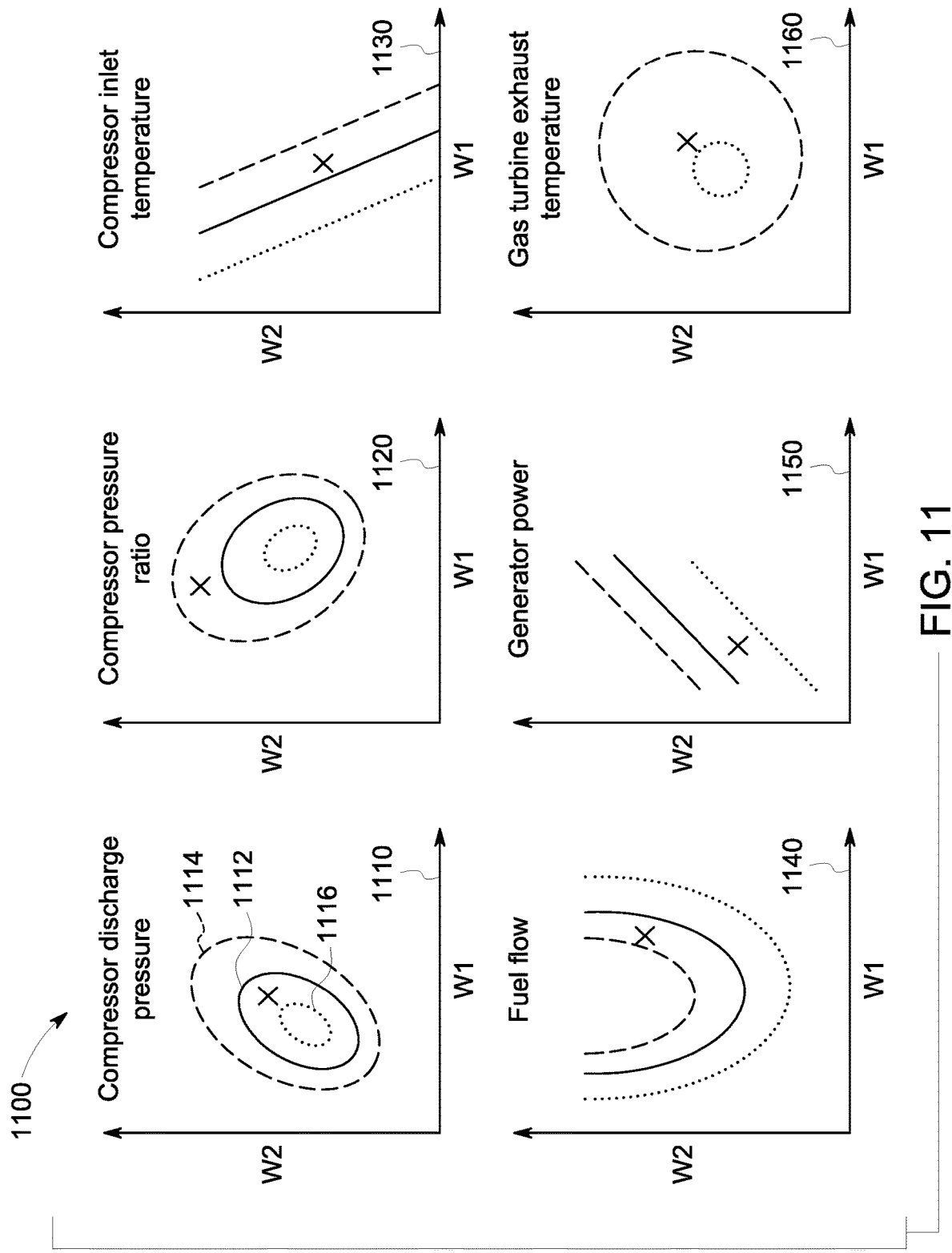
FIGS. 11 through 13 illustrate boundaries and locations of feature vectors for various parameters in accordance with some embodiments.

FIG. 11 illustrates 1100 boundaries and feature vectors for various monitoring node parameters in accordance with some embodiments. In particular, for each parameter a graph includes a first axis representing value weight 1 ("w1"), a feature 1, and a second axis representing value weight 4 ("w2"), a feature 4. Values for w1 and w2 might be associated with, for example, outputs from a Principal Component Analysis ("PCA") that is performed on the input data. PCA might be one of the features that might be used by the algorithm to characterize the data, but note that other features could be leveraged.

A graph is provided for compressor discharge temperature 1110, compressor pressure ratio 1120, compressor inlet temperature 1130, fuel flow 1140, generator power 1150, and gas turbine exhaust temperature 1160. Each graph includes a hard boundary 1112 (solid curve), inner boundary 1116 (dotted curve), and outer boundary 1114 (dashed curve) and an indication associated with current feature location for each monitoring node parameter (illustrated with an "X" on the graphs). As illustrated in FIG. 11, the current monitoring node location is between the minimum and maximum boundaries (that is, the "X" is between the dotted and dashed lines). As a result, the system may determine that the operation of the cyber-physical system control system is normal (and no threat is being detected indicating that the system is currently under attack or that a naturally occurring fault has occurred).

Figure 12:
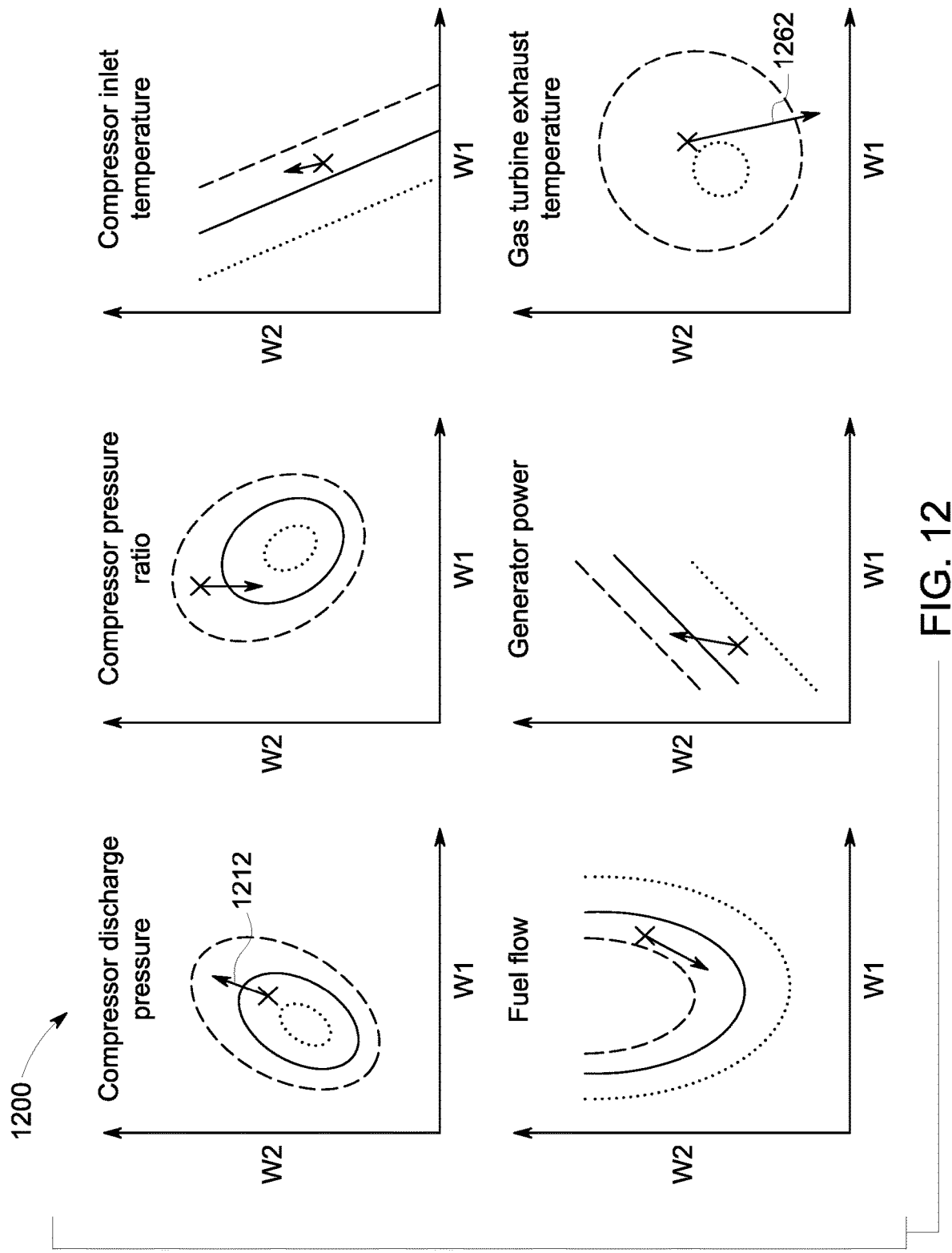

FIG. 12 illustrates 1200 subsequent boundaries and feature vectors for these parameters. Consider, for example, a feature vector movement 1212 for the compressor discharge pressure. Even though feature vector 1212 has moved, it is still within the maximum and minimum boundaries and, as a result, normal operation of that monitoring node may be determined. This is the case for the first five graphs in FIG. 12. In this example, a feature vector movement 1262 for the gas turbine exhaust temperature has exceeded with maximum boundary and, as a result, abnormal operation of that monitoring node may be determined. For example, a threat may exist for the exhaust temperature scale factor, which is a corrective value. The result is that the feature for the intermediary monitoring node signal feature vector illustrated in FIG. 12 moves 1262 such that it is anomalous. The algorithm detects this cyber-attack, and two parallel actions might be initiated. One action may be post processing of the signal to discover what was attacked, in this case if the system has been monitoring each exhaust thermocouple, it may conclude that none of them are currently abnormal. Therefore, it may be determined that something used to calculate this feature was attacked. The other action may be to continually monitor and detect additional attacks. Such an approach may facilitate a detection of multiple signal attacks.

Given the example of FIG. 12, assume that the gas turbine exhaust temperature signal was attacked. This may cause the system to respond in such a way so as to put other signals into an abnormal state. This is illustrated 1300 in FIG. 13, where the attack has already been detected and now other signals shown to be abnormal. In particular, feature movement for the compressor discharge pressure 1312, compressor pressure ratio 1322, compressor inlet temperature 1332, and fuel flow 1342 have all become abnormal (joining the feature vector for the gas turbine exhaust temperature 1362). Note that the feature vector for generator power did not become abnormal. In order to decide whether or not these signals 1312, 1322, 1332, 1342 are truly currently under attack, a historical batch with pertinent feature vector information may be kept for some duration of time. Then when an attack is detected on another signal, this batch is examined, and the time at which the confirmed attack on gas turbine exhaust temperature as well as several subsequent elements is analyzed.

Note that one signal rationalization might be associated with a system time delay. That is, after a sensor is attacked there might be a period of time before the system returns to a steady state. After this delay, any signal that becomes anomalous might be due to an attack as opposed to the system responding.

The current methods for detecting abnormal conditions in monitoring nodes are limited to Fault Detection Isolation and Accommodation ("FDIA"), which itself is very limited. The cyber-attack detection and localization algorithms described herein can not only detect abnormal signals of sensors, but can also detect signals sent to auxiliary equipment, control intermediary parameters and/or control logical(s). The algorithm can also understand multiple signal attacks. One challenge with correctly identifying a cyber-attack threat is that it may occur with multiple sensors being impacted by malware. According to some embodiments, an algorithm may identify in real-time that an attack has occurred, which sensor(s) are impacted, and declare a fault response. To achieve such a result, the detailed physical response of the system must be known to create acceptable decision boundaries. This might be accomplished, for example, by constructing data sets for normal and abnormal regions by running DoE experiments on high-fidelity models. A data set for each sensor might comprise a feature vector for given threat values (e.g., temperature, airflow, etc.). Full factorial, Taguchi screening, central composite and Box-Behnken are some of the known design methodologies used to create the attack space. When models are not available, these DoE methods are also used to collect data from real-world cyber-physical systems. Experiments may be run at different combinations of simultaneous attacks. In some embodiments, the system may detect degraded/faulty operation as opposed to a cyber-attack. Such decisions might utilize a data set associated with a degraded/faulty operating space. At the end of this process, the system may create data sets such as "attack v/s normal" and "degraded v/s normal" for use while constructing decision boundaries. Further note that a decision boundary may be created for each signal using data sets in feature space. Various classification methods may be used to compute decision boundaries. For example, binary linear and non-linear supervised classifiers are examples of methods that could be used to obtain a decision boundary.

Figure 13:
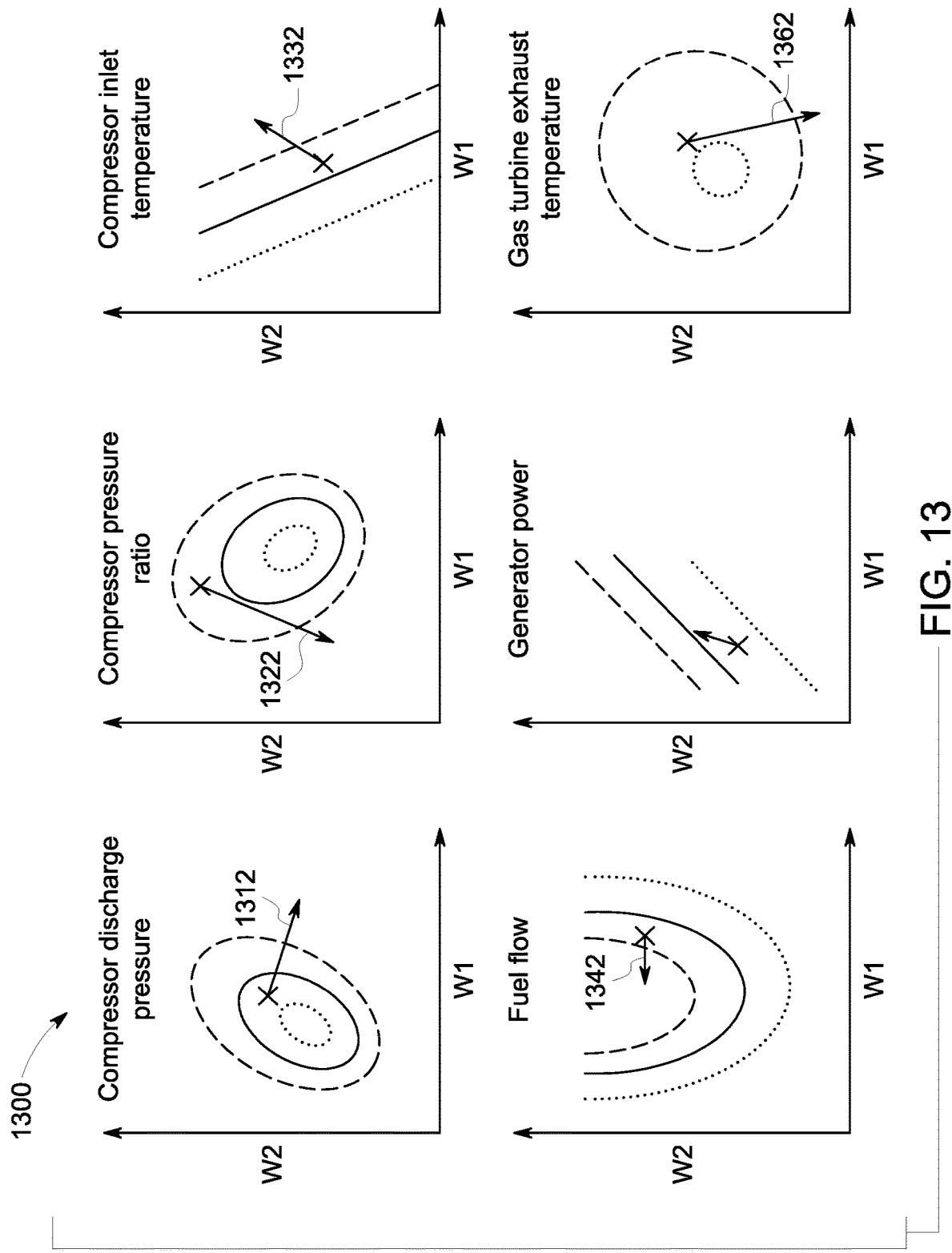

Note that multiple vector properties might be examined, and the information described with respect to FIGS. 11 through 13 may be processed to determine if the signal had been trending in a specific direction as the attack was detected (or if it had just been moving due to noise). Had the signal been uniformly trending as the attack took place and afterward, then this signal is a response to the original attack and not an independent attack.

According to some embodiments, the system may localize or otherwise analyze an origin of the threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in the threat alert signal.

Some embodiments described herein may take advantage of the physics of a cyber-physical system by learning a priori from tuned high-fidelity equipment models and/or actual "on the job" data to detect single or multiple simultaneous adversarial threats to the system. Moreover, according to some embodiments, all monitoring node data may be converted to features using advanced feature-based methods, and the real-time operation of the cyber-physical system may be monitored in substantially real-time. Abnormalities may be detected by classifying the monitored data as being "normal" or disrupted (or degraded). This decision boundary may be constructed using dynamic models and may help to enable early detection of vulnerabilities (and potentially avert catastrophic failures) allowing an operator to restore the cyber-physical system to normal operation in a timely fashion.

Thus, some embodiments may provide an advanced anomaly detection algorithm to detect cyber-attacks on, for example, key cyber-physical system control sensors. The algorithm may identify which signals(s) are being attacked using control signal-specific decision boundaries and may inform a cyber-physical system to take accommodative actions. In particular, a detection and localization algorithm might detect whether a sensor, auxiliary equipment input signal, control intermediary parameter, or control logical are in a normal or anomalous state. Some examples of cyber-physical system monitoring nodes that might be analyzed include: critical control sensors; control system intermediary parameters; auxiliary equipment input signals; and/or logical commands to controller.

A cyber-attack detection and localization algorithm may process a real-time cyber-physical system signal data stream and then compute features (multiple identifiers) which can then be compared to the sensor specific decision boundary. In some embodiments, generating features may involve simply performing an identity transform. That is, the original signal might be used as it is.

Figure 14:
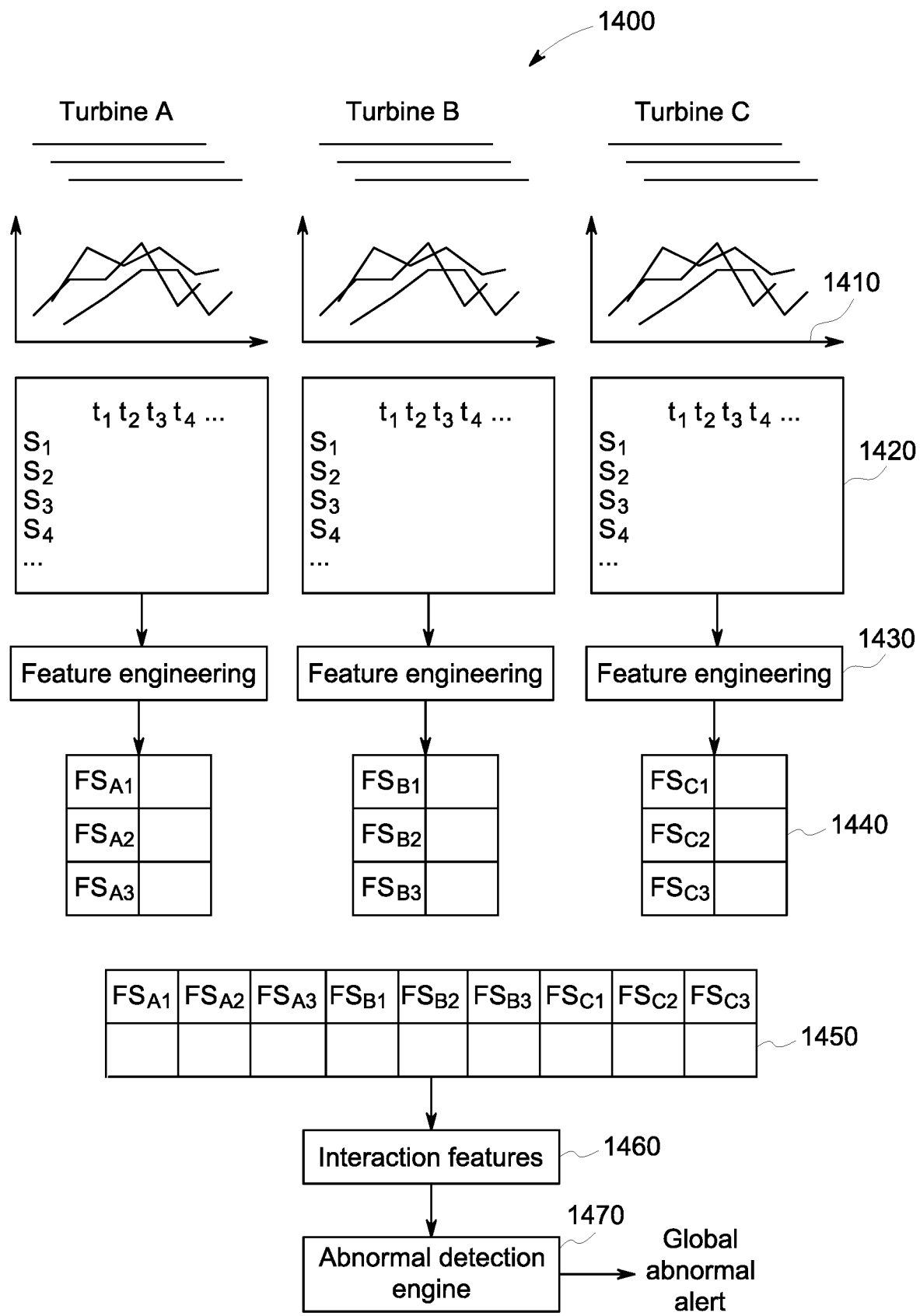
FIG. 14 is an example of a global abnormality protection system in accordance with some embodiments when multiple gas turbines are involved in a system.

Feature vectors may be generated on a monitoring-node-by-monitoring node basis and may be considered "local" to each particular monitoring node. FIG. 14 is an example of a "global" abnormality protection system 1400 in accordance with some embodiments when multiple gas turbines are involved in a system. In particular, the global system 1400 includes three turbines (A, B, and C) and batches of values 1410 from monitoring nodes are collected for each generated over a period of time (e.g., 60 to 80 seconds). The values for each node may be "local" to given node. According to some embodiments, the batches of values 1410 from monitoring nodes overlap in time. The values 1410 from monitoring nodes may, for example, be stored in a matrix 1420 arranged by time ($t_1$, $t_2$, etc.) and by type of monitoring node ($S_1$, $S_5$, etc.). Feature engineering components 1430 may use information in each matrix 1420 to create a feature vector 1440 (local feature vector) for each of the three turbines (e.g., the feature vector 1440 for turbine C might include $FS_{C1}$, $FS_{C2}$, etc.). The three local feature vectors 1440 may then be combined into a single global feature vector 1450 for the system 1400. Interaction features 1460 may be applied (e.g., associated with A*B*C, A+B+C, etc.) and an anomaly detection engine 1470 may compare the result with a decision boundary and output a global abnormal alert signal when appropriate.

Thus, a system may generate both local normal/abnormal decisions (for each monitoring node) and a global normal/abnormal decision (for the entire cyber-physical system).

Figure 15:
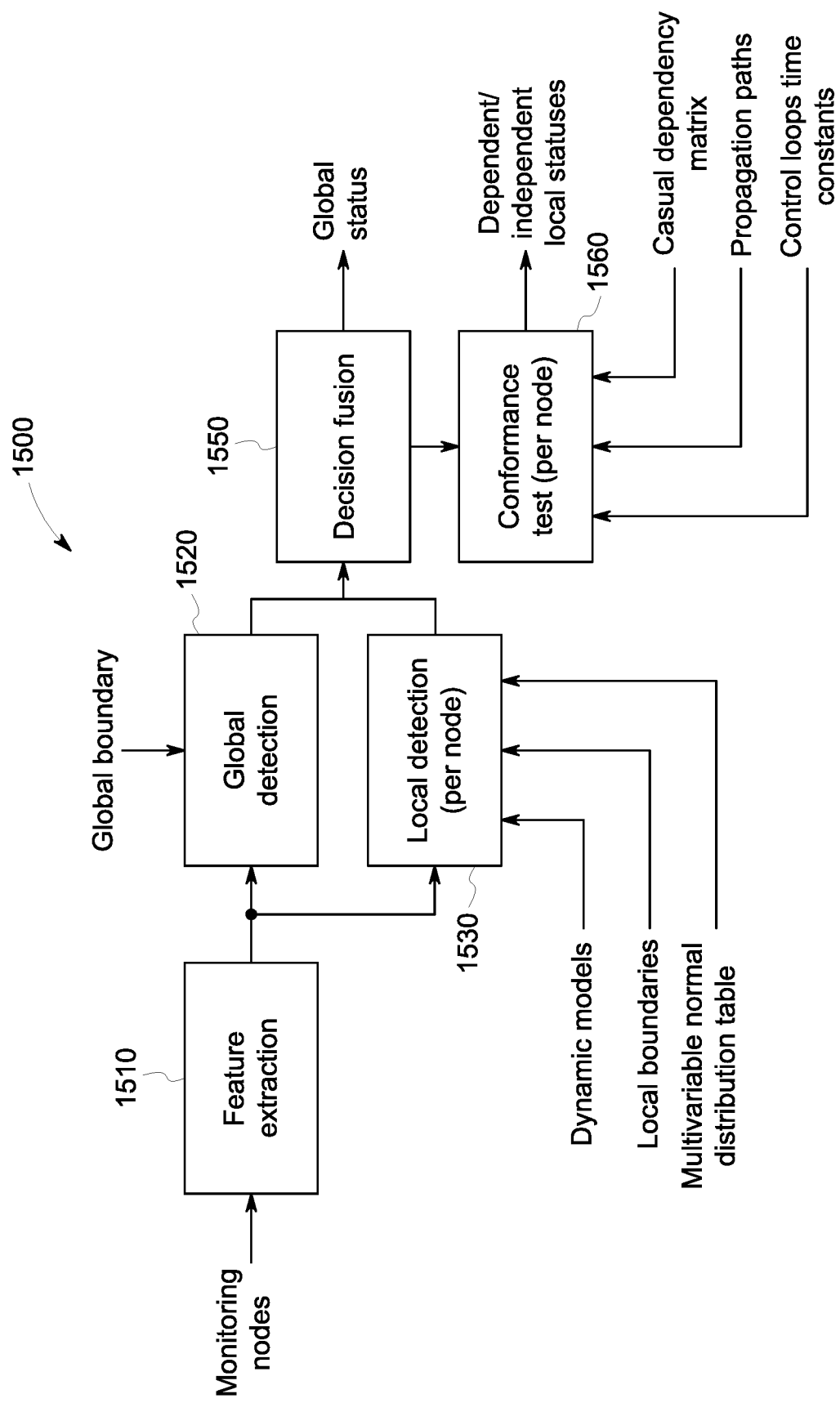
FIG. 15 is a detection and localization system architecture according to some embodiments.

FIG. 15 is a detection and localization system architecture 1500 according to some embodiments. After feature extraction 1510 is performed on monitoring node data, the result is provided to global detection 1520 and local detection 1530. The global detection 1520 uses the features and a global decision boundary to determine an initial global status. The local detection 1530 uses dynamic models, local boundaries, and a multivariable normal distribution table to determine initial local statuses on a node-by-node basis. The decisions from the global detection 1520 and local detection 1530 undergo decision fusion 1550 to generate fused global and local statuses.

Figure 16:
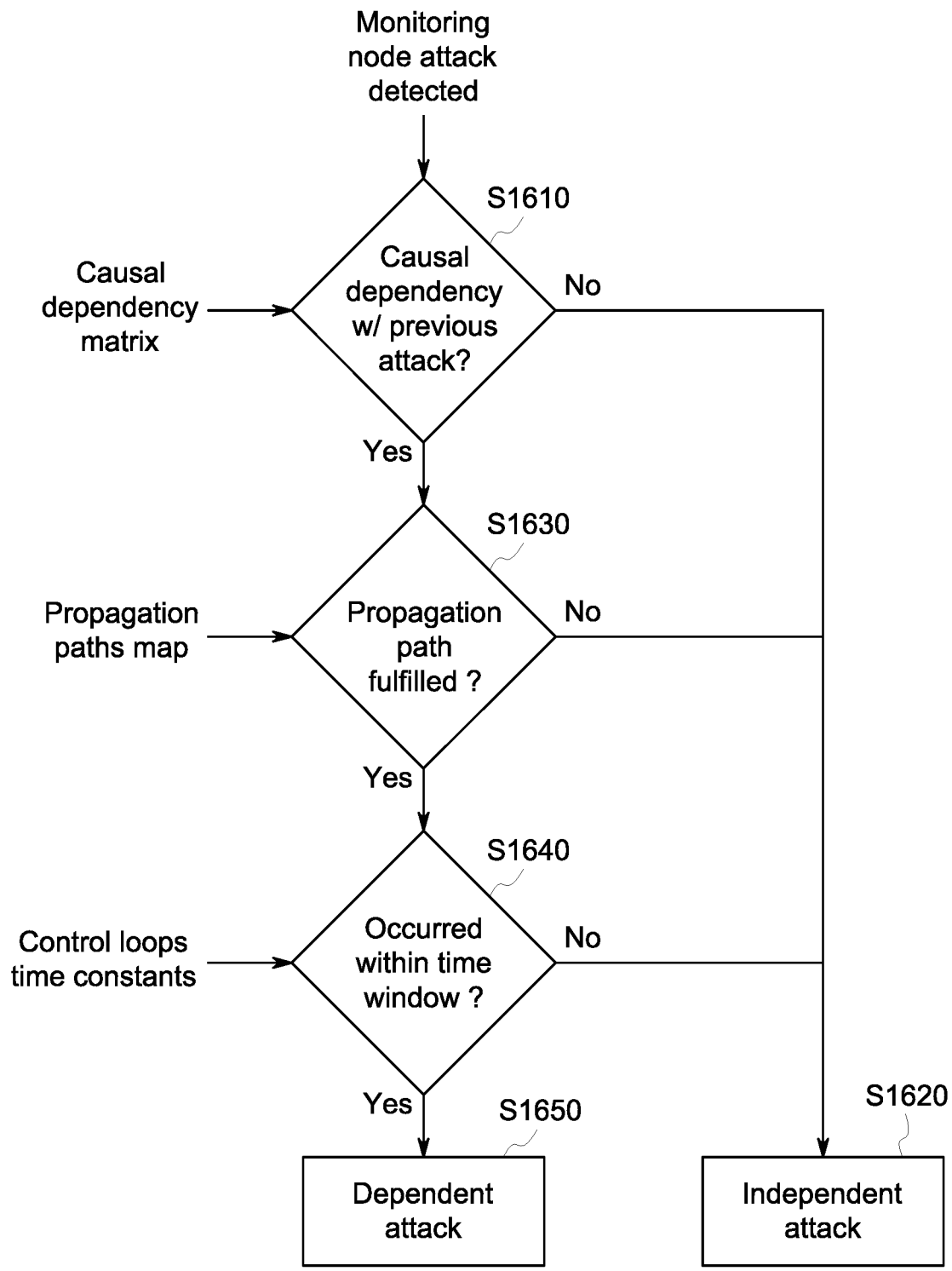
FIG. 16 is a method of determining whether an attack is an independent attack or dependent attack in accordance with some embodiments.

According to some embodiments, a conformance test 1560 may further determine (on a node-by-node basis) whether an abnormal local status is "independent" or "dependent" (likely caused by an abnormality existing at another monitoring node) based on a casual dependency matrix, propagation paths, control loops time constraints, etc. For example, FIG. 16 is a method of determining whether an attack is an independent attack or dependent attack in accordance with some embodiments. According to some embodiments, three tests may be performed to determine if an attack should be classified as an "independent attack" or a "dependent attack:" (1) a causal dependency test, (2) a propagation path test, and (3) a time separation test. Together, these three tests may be referred to herein as an "attack dependency conformance test." At S1610, a causal dependency matrix may be used to determine if the current attack was potentially caused by a previous attack. If the current attack could not have been caused by a previous attack at S1610, it is classified as an "independent attack" at S1620. In this causality test, the system may check whether there is a potential causal dependency between the newly detected attack and any previously detected attack on other monitoring nodes. This check might be based on, for example, a binary matrix of causal dependencies between any two nodes. The causal dependency matrix might be generated, according to some embodiments, based on domain knowledge. If no such possible dependencies exist the attack is reported as an "independent attack" at S1620. Otherwise, the system may perform a second check.

At S1630 a propagation paths map may be used to determine if the current attack potentially propagated from a previous attack. If the current attack could not have propagated from a previous attack at S1630, it is classified as an "independent attack" at S1620. In this propagation test, for each causal dependency the system may check whether a propagation path is fulfilled. This might mean that, for example, if the effect of node 1 being under attack is propagated to node 4, through node 3, then an anomaly in node 1 can cause an anomaly on node 4 only if node 3 is already anomalous. The anomaly propagation paths might also be defined by domain knowledge and pre-stored in the localization system. If no such propagation paths are fulfilled, then the attack is reported an "independent attack" at S1620. Otherwise, the system may perform the third check.

At S1640, control loops time constraints may be used to determine if the current attack was potentially caused by a previous attack based on time separation. If the current attack could not have been caused by a previous attack based on time separation at S1640, it is classified as an "independent attack" at S1620. This time separation test may utilize the fact that if the attacked monitoring under investigation is an artifact of the closed-loop feedback system, then the effect should arise within a time window between the rise time and the settling time of the control loop corresponding to the monitoring node. However, since the system uses a dynamic estimator, a propagation time may need to be added throughout the estimator. Using n features, and p lags in the models, the dynamic estimator will have n*p states, and therefore adds n*p sampling times delay into the system. Therefore, the expected time window for a dependent attack to occur might be defined by:

$$1.5*\tau+n*p<\Delta t<5*\tau+n*p$$

where $\Delta t$ is the time after any previously detected attacks on other nodes that has passed checks 1 and 2, and $\tau$ is the time constant of the control loop responsible for the current node under investigation. If such a time-separation check is not passed, the system reports the attack as an independent attack at S1620. If it is determined at S1650 that the current attack meets the time separation test (and, therefore, also meets both the propagation test of S1630 and the causal dependency test of S1610), the current attack is classified as a "dependent attack" at S1650.

Note that other attack and anomaly detection techniques may only provide a binary status of the overall system (whether it is under attack or not). Embodiments described herein may also provide an additional layer of information by localizing the attack and determining not only if the system is under attack (or not) but also which node is exactly under attack. Note that attack localization information may be important when responding to the attack, including operator action plans and resilient control under attack. Embodiments described herein may handle multiple simultaneous anomalies in the system, which is beyond the capability of the conventional fault detection systems. This may also let the approaches described herein be used as a fault detection and isolation technique for more sophisticated, multiple-fault scenarios. Further, distributed detection and localization systems enabled by embodiments described herein across multiple equipment and systems may allow for a coordination of data to detect and precisely pin-point coordinated multi-prong attacks. This may further enable a relatively quick way to perform forensics and/or analysis after an attack.

Note that some embodiments may analyze information in the feature space, which has many advantages over working in the original signal spaces, including high-level data abstraction and modeling high dimensional spaces without adding substantial computational complexity. The feature-based method for localization may also extend feature vectors and/or incorporate new features into existing vectors as new learnings or alternate sources of data become available. Embodiments described herein may also enable use of heterogeneous sensor data in a large scale interconnected system, even when the data comes from many geospatially located heterogeneous sensors (i.e., conventional plant sensors, unconventional sensors such as cell-phone data, logical, etc.). This may offer additional commercial advantages for post-mortem analysis after an attack.

Figure 17:
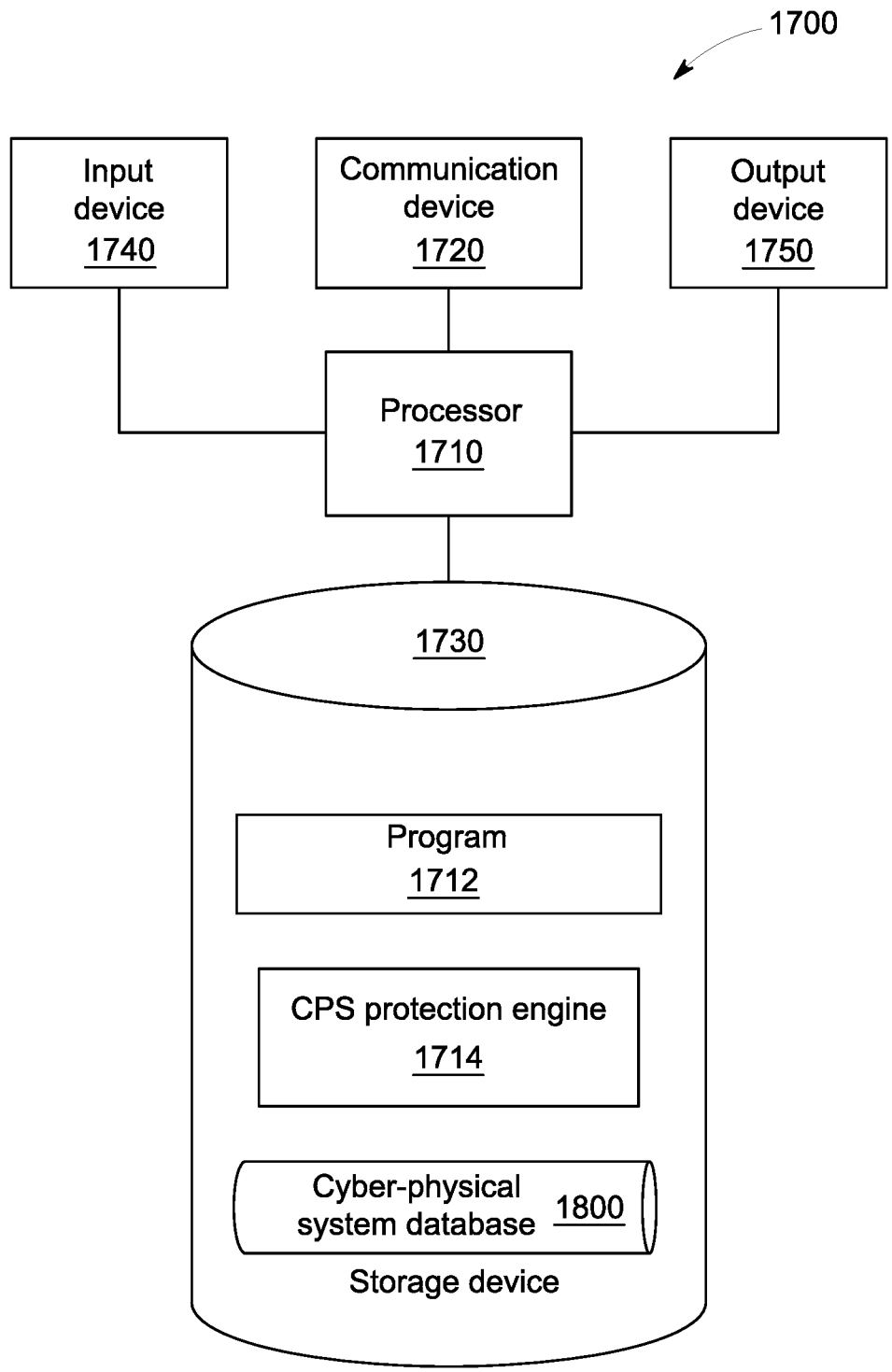
FIG. 17 is a cyber-physical system protection platform according to some embodiments.

Note that the embodiments described herein may be implemented using any number of different hardware configurations. For example, FIG. 17 is a block diagram of a cyber-physical system protection platform 1700 that may be, for example, associated with the systems 100, 300 of FIGS. 1 and 3, respectively, and/or any other system described herein. The cyber-physical system protection platform 1700 comprises a processor 1710, such as one or more commercially available Central Processing Units ("CPUs") in the form of one-chip microprocessors, coupled to a communication device 1720 configured to communicate via a communication network (not shown in FIG. 17). The communication device 1720 may be used to communicate, for example, with one or more remote monitoring nodes, user platforms, digital twins, etc. The cyber-physical system protection platform 1700 further includes an input device 1740 (e.g., a computer mouse and/or keyboard to input cyber-physical system parameters and/or modeling information) and/an output device 1750 (e.g., a computer monitor to render a display, provide alerts, transmit recommendations, and/or create reports). According to some embodiments, a mobile device, monitoring physical system, and/or PC may be used to exchange information with the cyber-physical system protection platform 1700.

The processor 1710 also communicates with a storage device 1730. The storage device 1730 may comprise any appropriate information storage device, including combinations of magnetic storage devices (e.g., a hard disk drive), optical storage devices, mobile telephones, and/or semiconductor memory devices. The storage device 1730 stores a program 1712 and/or cyber-physical system protection engine 1714 for controlling the processor 1710. The processor 1710 performs instructions of the programs 1712, 1714, and thereby operates in accordance with any of the embodiments described herein. For example, the processor 1710 may receive from a detection model an anomaly score for each monitoring node and, then compare that anomaly score to an adaptive threshold to determine whether each monitoring node has a local status of "normal" or "abnormal.". The processor 1710 may also receive, from a detection model an anomaly score for the whole system and then compare that anomaly score to an adaptive threshold to determine whether the system has a global status of "normal" or "abnormal". The processor 1710 may then output, for each monitoring node, a local status of "normal" or "abnormal,". The processor 1710 may also output a global status of "normal" or "abnormal" for the system.

The programs 1712, 1714 may be stored in a compressed, uncompiled and/or encrypted format. The programs 1712, 1714 may furthermore include other program elements, such as an operating system, clipboard application, a database management system, and/or device drivers used by the processor 1710 to interface with peripheral devices.

As used herein, information may be "received" by or "transmitted" to, for example: (i) the cyber-physical system protection platform 1700 from another device; or (ii) a software application or module within the cyber-physical system protection platform 1700 from another software application, module, or any other source.

In some embodiments (such as the one shown in FIG. 17), the storage device 1730 further stores a cyber-physical system database 1800. An example of a database that may be used in connection with the cyber-physical system protection platform 1800 will now be described in detail with respect to FIG. 18. Note that the database described herein is only one example, and additional and/or different information may be stored therein. Moreover, various databases might be split or combined in accordance with any of the embodiments described herein.

Referring to FIG. 18 a table is shown that represents the cyber-physical system database 1800 that may be stored at the cyber-physical system protection platform 1700 according to some embodiments. The table may include, for example, entries identifying trigger events and threshold levels for monitoring nodes/system. The table may also define fields 1802, 1804 for each of the entries. The fields 1802, 1804 may, according to some embodiments, specify: trigger event 1802 and an associated threshold level 1804. The cyber-physical system database 1800 may be created and updated, for example, when a new physical system is monitored or modeled, an attack is detected, etc.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). Moreover, although some embodiments are focused on gas turbines, any of the embodiments described herein could be applied to other types of cyber-physical systems including power grids, dams, locomotives, airplanes, and autonomous vehicles (including automobiles, trucks, drones, submarines, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system to protect a cyber physical system, comprising:
   a plurality of real-time monitoring nodes to receive streams of monitoring node signal values over time that represent a current operation of the cyber physical system, wherein each real-time monitoring node is one of a sensor or an actuator; and
   a threat detection computer platform, coupled to the plurality of real-time monitoring nodes, to:
   receive the monitoring node signal values;
   compute an anomaly score;
   select one of a multi-level process and a continuous process to generate an adaptive threshold;
   generate the adaptive threshold via the selected process;
   compare the anomaly score with the generated adaptive threshold; and
   detect that one of a particular monitoring node and a system is outside a decision boundary based on the comparison, and classify that particular monitoring node or system as anomalous.

2. The system of claim 1, wherein the adaptive threshold is one of a multi-level threshold and a continuous adaptive threshold.

3. The system of claim 2, wherein in a case the adaptive threshold is the multi-level threshold, the threat detection computer platform further adapted to:
   receive a trigger signal indicative of a level of the multi-level threshold prior to comparison of the anomaly score values with the adaptive threshold;
   determine the adaptive threshold based on the received trigger signal; and
   compare the monitoring node signal values to the indicated level of the multi-level threshold.

4. The system of claim 3, wherein the levels of the multi-level threshold are based on one of a mode of operation, a region of operation and one or more ambient conditions.

5. The system of claim 2, wherein the levels of the multi-level threshold are finite.

6. The system of claim 2, wherein the continuous adaptive threshold is continuously modified in real-time.

7. The system of claim 2, wherein the continuous adaptive threshold is based on one of:
   a static model, wherein an underlying model governing changes in the threshold is static; and
   a dynamic model, wherein an underlying model governing changes in the threshold is a time-series model.

8. The system of claim 7, wherein the static model is one of a threshold look-up table and a regression model.

9. The system of claim 1, wherein the threat detection computer platform is further adapted to generate, for each stream of monitoring node signal values, a current monitoring node feature vector for computation of an anomaly score and comparison with the adaptive threshold.

10. The system of claim 1, wherein at least one of the monitoring nodes is associated with at least one of: sensor data, an auxiliary equipment input signal, a control intermediary parameter, valves, circuit breakers, and a control logic value.

11. The system of claim 1, wherein the threat detection computer platform is further adapted to:
   generate a safe margin for the adaptive threshold, wherein the safe margin is a distance between the adaptive threshold and a normal variation in the anomaly score.

12. The system of claim 11, wherein the distance is generated based on one of: 1. a combination of a mean, standard deviation and extreme values, and 2. a time-series model.

13. A computer-implemented method to protect a cyber physical system comprising:
   receiving a stream of monitoring node signal values from a plurality of real-time monitoring nodes, wherein the monitoring node signal value represent a current operation of the cyber physical system, wherein each real-time monitoring node is one of a sensor and an actuator;
   computing an anomaly score;
   selecting one of a multi-level process and a continuous process to generate an adaptive threshold;
   generating the adaptive threshold via the selected process;
   comparing the anomaly score with the generated adaptive threshold; and
   detecting that one of a particular monitoring node and a system is outside a decision boundary based on the comparison, and classifying that particular monitoring node or system as anomalous.

14. The method of claim 13, wherein the adaptive threshold is one of a multi-level threshold and a continuous adaptive threshold.

15. The method of claim 14, wherein in a case the adaptive threshold is the multi-level threshold:
   receiving a trigger signal indicative of a first level of the multi-level threshold prior to comparison of the anomaly score values with the adaptive threshold; and
   comparing the monitoring node signal values to the indicated level of the multi-level threshold.

16. The method of claim 15, wherein the levels of the multi-level threshold are based on one of a mode of operation, region of operation, an ambient condition, and a weather event.

17. The method of claim 14, wherein the levels of the multi-level threshold are finite.

18. A non-transitory, computer-readable medium storing program code, the program code executable by a computer processor to cause the processor to perform a method to protect a cyber physical system associated with a plurality of real-time monitoring nodes, each generating a series of current monitoring node values over time that represent a current operation of the cyber physical system, the method comprising:

receiving a stream of monitoring node signal values from the plurality of real-time monitoring nodes, wherein each real-time monitoring node is one of a sensor and an actuator;

computing an anomaly score;

selecting one of a multi-level process and a continuous process to generate an adaptive threshold;

generating the adaptive threshold via the selected process;

comparing the anomaly score with the generated adaptive threshold; and detecting that one of a particular monitoring node and a system is outside a decision boundary based on the comparison, and classifying that particular monitoring node or system as anomalous.

19. The medium of claim 18, wherein the adaptive threshold is one of a multi-level threshold and a continuous adaptive threshold.

20. The medium of claim 19, wherein in a case the adaptive threshold is the multi-level threshold, the method further comprising:

receiving a trigger signal indicative of a first level of the multi-level threshold prior to comparison of the anomaly score values with the adaptive threshold; and comparing the monitoring node signal values to the indicated level of the multi-level threshold.

* * * * *